United States Patent
Cheng et al.

(10) Patent No.: US 9,899,841 B2
(45) Date of Patent: Feb. 20, 2018

(54) SMART AND GRID-FLEXIBLE POWER INVERTERS

(71) Applicant: CyboEnergy, Inc., Rancho Cordova, CA (US)

(72) Inventors: George Shu-Xing Cheng, Folsom, CA (US); Steven L. Mulkey, Cameron Park, CA (US); Andrew J. Chow, Sacramento, CA (US)

(73) Assignee: CyboEnergy, Inc., Rancho Cordova, CA (US)

( * ) Notice: Subject to any disclaimer, the term of this patent is extended or adjusted under 35 U.S.C. 154(b) by 529 days.

(21) Appl. No.: 14/630,502

(22) Filed: Feb. 24, 2015

(65) Prior Publication Data

US 2016/0164295 A1    Jun. 9, 2016

Related U.S. Application Data

(60) Provisional application No. 62/087,644, filed on Dec. 4, 2014.

(51) Int. Cl.
  *H02J 3/38* (2006.01)

(52) U.S. Cl.
  CPC ............ *H02J 3/38* (2013.01); *H02J 3/382* (2013.01); *H02J 3/383* (2013.01); *H02J 3/386* (2013.01); *Y02E 10/563* (2013.01); *Y02E 10/763* (2013.01)

(58) Field of Classification Search
  CPC .. H02M 7/44; H02M 7/49; H04M 3/54; H02J 3/387; H02J 3/383; H02J 3/385; H02J 2001/004; H01L 31/02021; Y10T 307/707; Y02E 10/563
  USPC .......................................................... 307/82
  See application file for complete search history.

(56) References Cited

U.S. PATENT DOCUMENTS

| | | | |
|---|---|---|---|
| 8,786,133 B2 * | 7/2014 | Cheng ............... | H01L 31/02021 307/82 |
| 2013/0099575 A1 * | 4/2013 | Loubier ................... | G05B 9/02 307/77 |
| 2014/0077609 A1 * | 3/2014 | Fornage .................. | H02J 3/381 307/77 |

* cited by examiner

*Primary Examiner* — Daniel Kessie
(74) *Attorney, Agent, or Firm* — Donald E. Stout; Stout, Uxa & Buyan, LLP

(57) ABSTRACT

A method and apparatus is disclosed that can intelligently invert DC power from single or multiple DC sources to single-phase, split-phase, or three-phase AC power, supply the AC power to the electric power grid when the grid is on, or supply AC power to electric devices or loads when the grid is down. A Smart and Grid-Flexible Power Inverter, or On/Off-Grid Power Inverter, is disclosed that can work in either the on-grid or off-grid mode, and switch back and forth between the two modes manually or automatically depending on the power grid conditions. The system provides a simple and cost-effective solution for areas where the power grid has frequent outages or long downtimes.

10 Claims, 14 Drawing Sheets

SMART AND GRID-FLEXIBLE POWER INVERTERS

This application claims priority to U.S. Provisional Application No. 62/087,644 filed on Dec. 4, 2014, which is herein incorporated by reference.

The subject of this patent relates to direct current (DC) to alternating current (AC) power inverters that invert DC power from single or multiple DC power sources to single-phase or three-phase AC power, where the DC power sources include but are not limited to photovoltaic (PV) solar modules or panels, PV cells, PV materials, PV thin films, fuel cells, batteries, wind turbines, bio-fuel generators, and other DC power generators. More particularly, this patent relates to a method and apparatus that can intelligently invert DC power from single or multiple DC sources to AC power, supply the AC power to the electric power grid when the grid is on, or supply AC power to electrical devices or loads when the grid is down. This approach provides a simple and cost-effective solution for areas where the power grid has frequent outages or long downtimes.

In the U.S. Pat. No. 8,786,133, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application Ser. No. 13/397,402, the entirety of which is hereby incorporated by reference, we described the Scalable and Redundant Mini-Inverters that have double, triple, or quadruple redundant capabilities so that the Mini-Inverters can work in a harsh environment for a prolonged period of time. A number of regular, redundant, triple redundant, or quadruple redundant Mini-Inverters with one, two, three, or multiple input channels in a mixed variety can easily connect to one, two, three, or multiple DC power sources such as solar PV modules, invert the DC power to AC power, and daisy chain together to generate AC power to feed the power grid.

In the U.S. patent application Ser. No. 13/493,622, the entirety of which is hereby incorporated by reference, we described the Smart and Scalable Off-Grid Mini-Inverters having one or multiple DC input channels that can invert DC power to AC power, and supply AC power to power electrical devices including motors, pumps, fans, lights, appliances, and homes.

In the U.S. patent application Ser. No. 13/537,206, the entirety of which is hereby incorporated by reference, we described an enclosure design to accommodate and support the unique features and capabilities of the Smart and Scalable Power Mini-Inverters that have multiple input channels, and a messaging system using LEDs (light-emitting diodes) mounted on the enclosure to indicate the system status of the Smart and Scalable Mini-Inverters.

In the U.S. patent application Ser. No. 13/789,637, the entirety of which is hereby incorporated by reference, we described a method and apparatus for maximizing power production for solar power systems when there is low sunlight during sunrise, sunset, clouding, partial shading, and other low irradiance conditions. A multiple-channel solar power Mini-Inverter can work in the low power mode when there is low sunlight, take power from one solar module to supply DC power to its internal electronic circuits, and also invert the DC power from the remaining connected solar modules to AC power feeding to the electric grid or powering AC loads.

In the U.S. patent application Ser. No. 13/844,484, the entirety of which is hereby incorporated by reference, we described a method and apparatus that can monitor the solar power inverters in real-time both day and night, and generate surveillance alarms and actions when a solar power inverter is removed or disconnected from the AC powerline for no good reason. It offers a low cost and reliable surveillance means to help guard a residential-scale, commercial-scale, or utility-scale solar power system in real-time at all times.

In the U.S. patent application Ser. No. 13/846,708, the entirety of which is hereby incorporated by reference, we described a method and apparatus for solar power generation when irradiance changes quickly or is very low due to sunrise, sunset, clouding, partial shading, warped PV surfaces, moving solar modules, and other low or varying irradiance conditions. A multi-channel solar power inverter connected to multiple solar modules can work in a "Lunar Power Mode", inverting DC power induced from the sky, street lights, or surrounding environment to AC power.

In this patent, we disclose the Smart and Grid-Flexible Power Inverters, or On/Off-Grid Power Inverters, that can work in either the on-grid or off-grid mode, and switch back and forth between the two modes automatically or manually depending on the power grid conditions. Each Smart and Grid-Flexible Power Inverter can have one or multiple DC input channels that can connect to one or multiple DC sources directly. The same inverter may be called either the smart and grid-flexible power inverter or on/off-grid power inverter.

Figure 3:
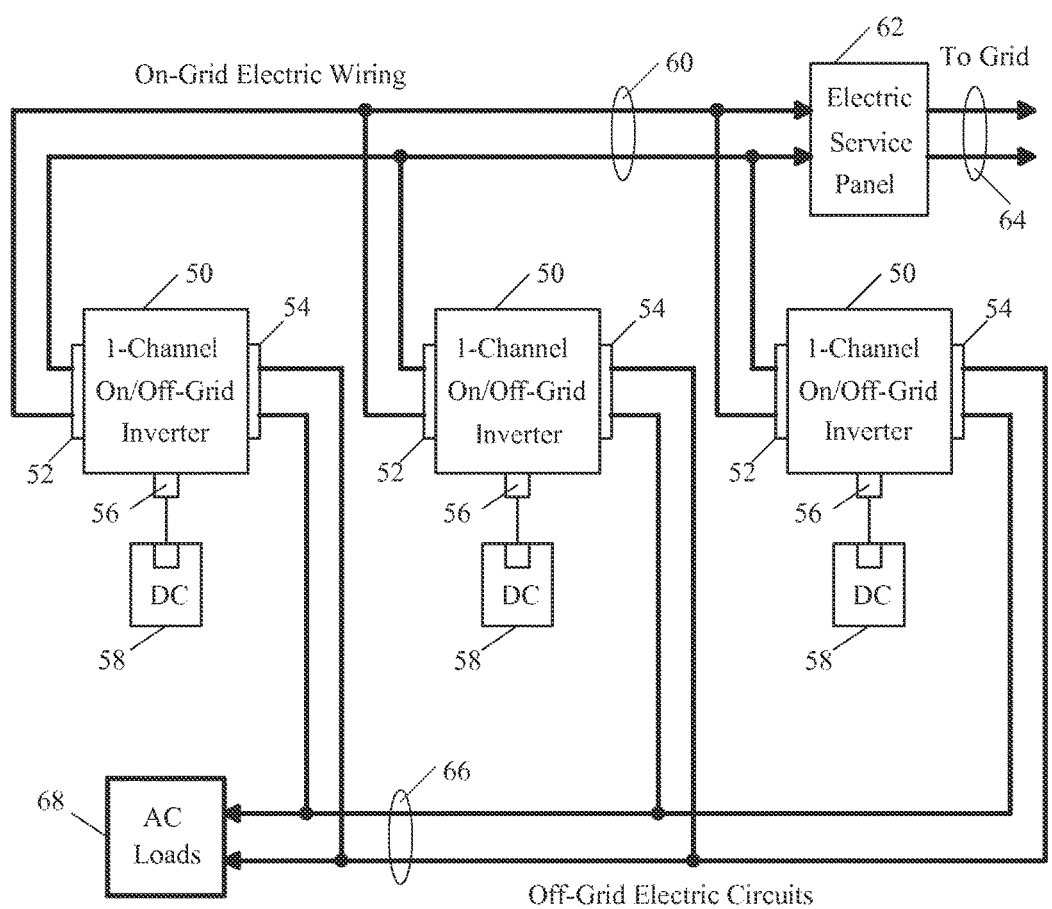

FIG. 3 is a block diagram illustrating a grid-flexible power inversion and optimization system where 2 or more single-channel on/off-grid power inverters are arranged as a group, each of the inverters inverts the DC power from one DC source to AC power, where the combined AC power from all inverters is either sent to the electric grid or to an off-grid AC circuit to power AC loads, according to an embodiment of this invention.

Figure 4:
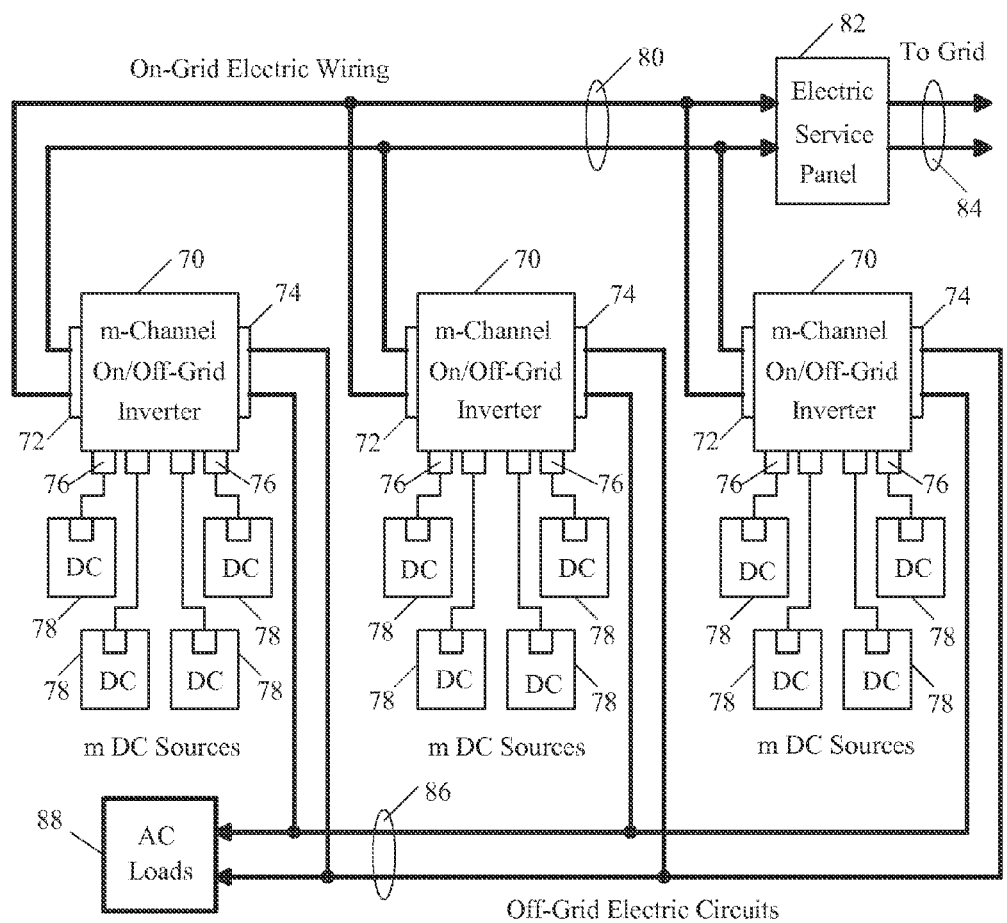

FIG. 4 is a block diagram illustrating a grid-flexible power inversion and optimization system where 2 or more m-channel on/off-grid power inverters are arranged as a group, each of the inverters inverts the DC power from m DC sources to AC power, where the combined AC power from all inverters is either sent to the electric grid or to an off-grid AC circuit to power AC loads, according to an embodiment of this invention.

Figure 5:
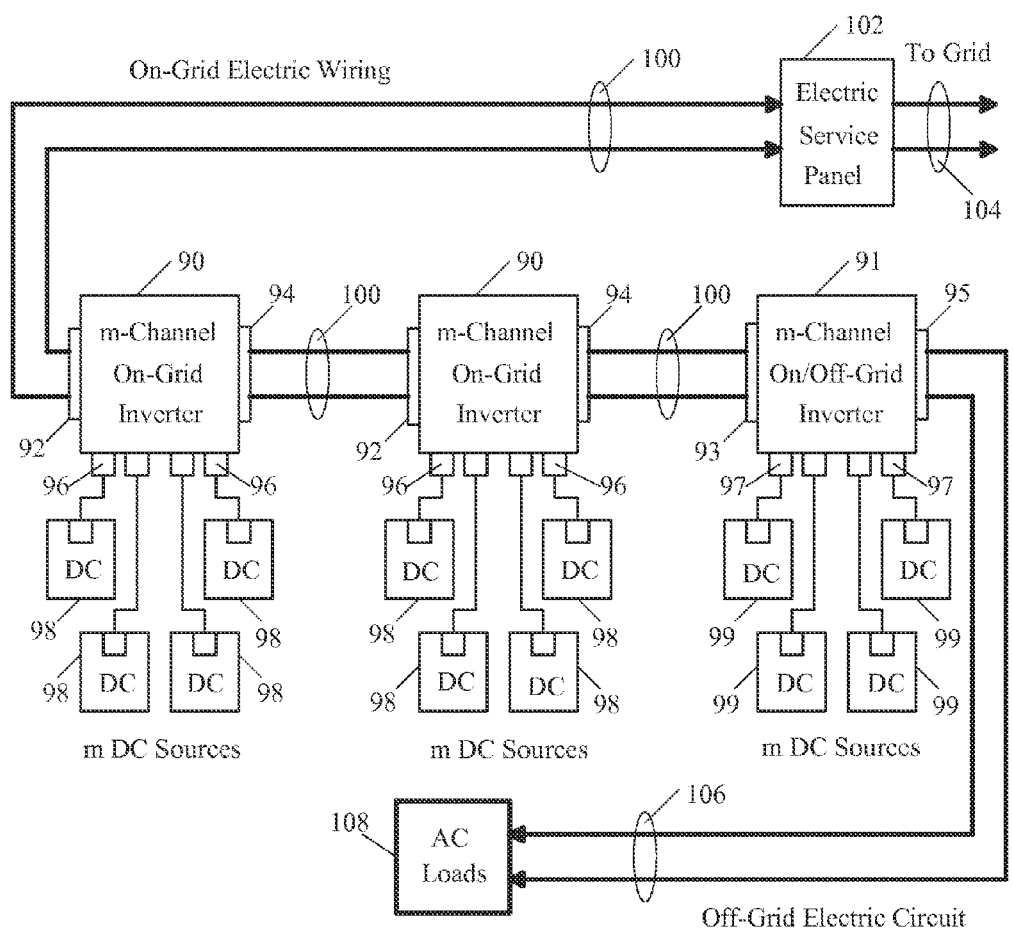

FIG. 5 is a block diagram illustrating a combined on-grid and grid-flexible power inversion and optimization system where 2 or more m-channel on-grid power inverters and one m-channel on/off-grid power inverter daisy-chain to form a group, each of the inverters inverts the DC power from m DC sources to AC power, where the combined AC power from the on-grid outputs of all inverters is sent to the electric grid when the grid is on, and when the grid is down, AC power from the off-grid output of the on/off-grid power inverter is sent to an off-grid AC circuit to power AC loads, according to an embodiment of this invention.

Figure 6:
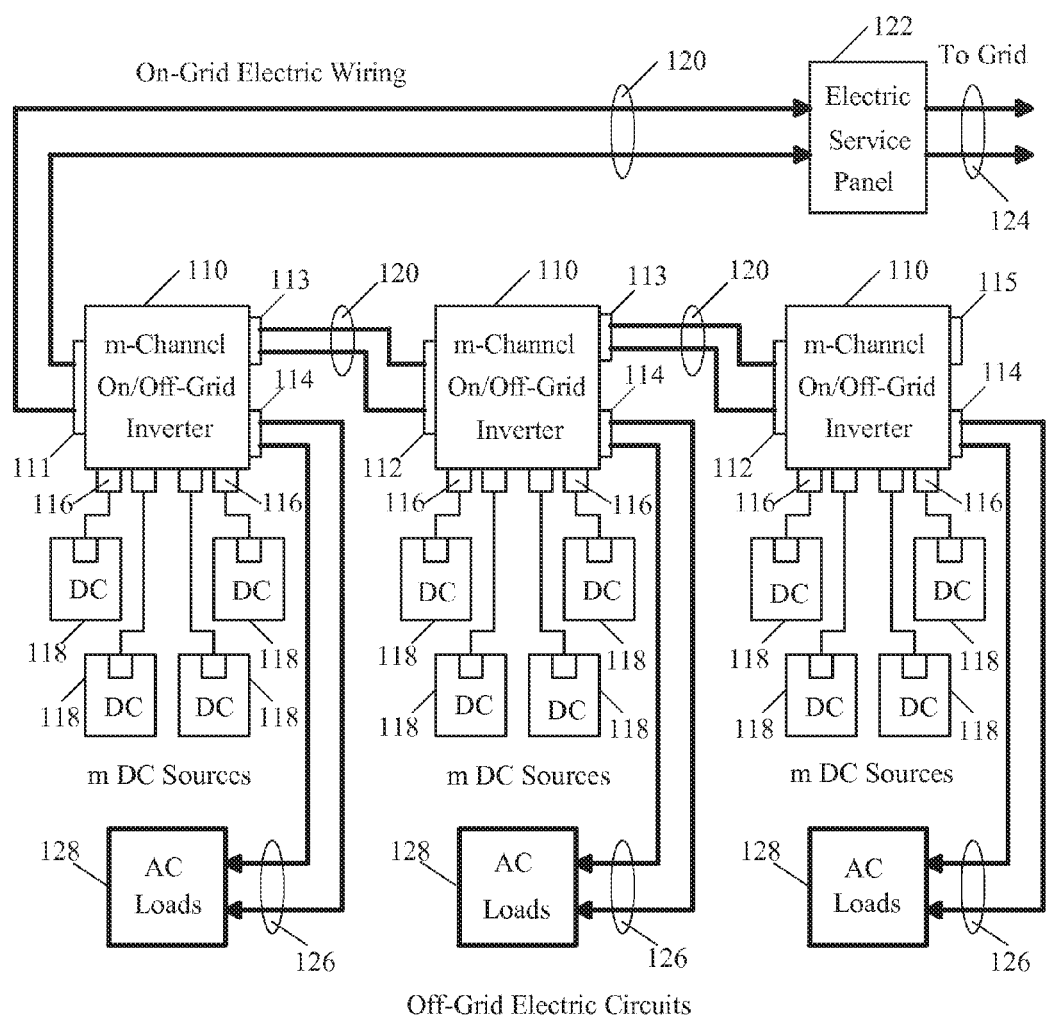

FIG. 6 is a block diagram illustrating a grid-flexible power inversion and optimization system where 2 or more m-channel on/off-grid power inverters daisy-chain to form a group, each of the inverters inverts the DC power from m DC sources to AC power, where the combined AC power from the on-grid outputs of all inverters is sent to the electric grid when the grid is on, and when the grid is down, AC power from the off-grid output of each of the inverters powers its corresponding connected AC loads, according to an embodiment of this invention.

Figure 7:
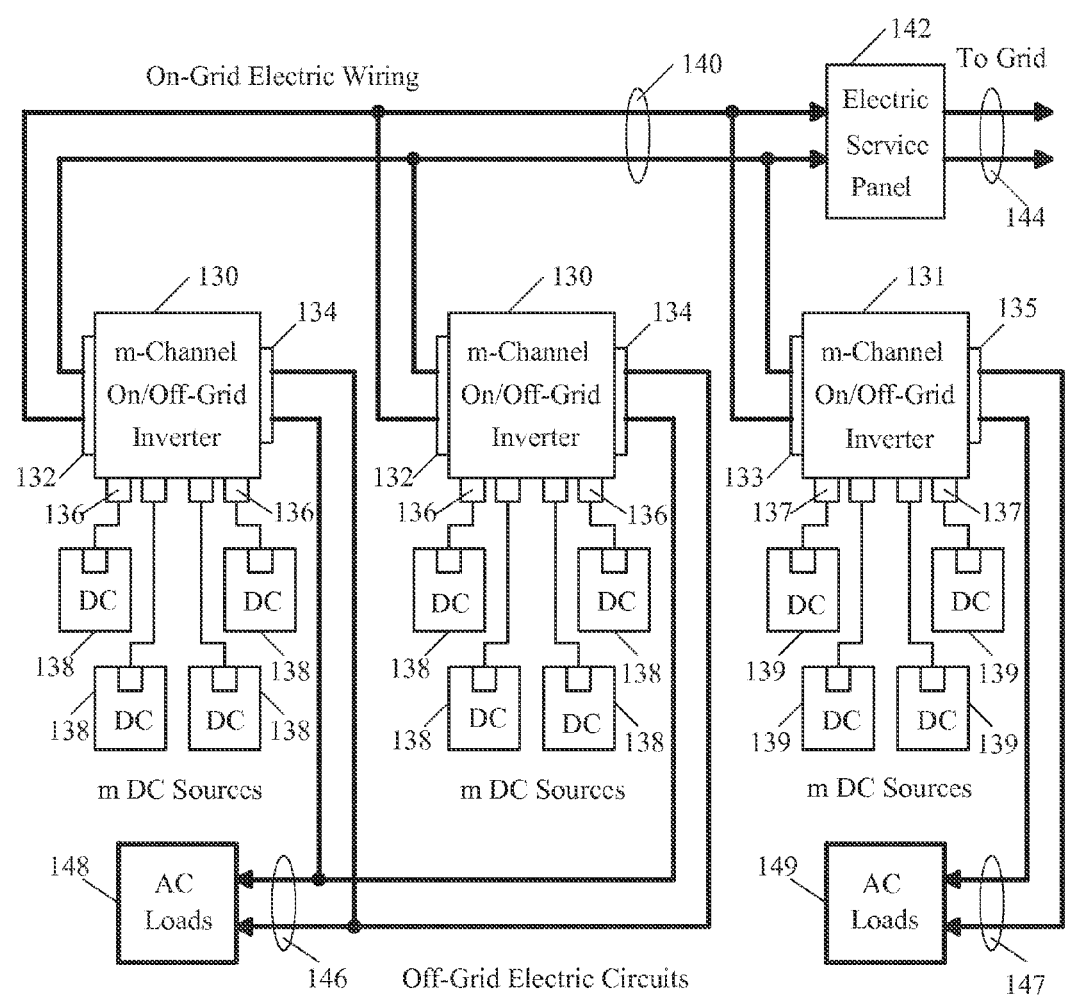

FIG. 7 is a block diagram illustrating a grid-flexible power inversion and optimization system where 2 or more m-channel on/off-grid power inverters are arranged as a group, each of the inverters inverts the DC power from m DC sources to AC power, where the combined AC power from the on-grid outputs of all inverters is sent to the electric grid when the grid is on, and when the grid is down, single or multiple off-grid outputs from their corresponding inverters are combined to form 2 or more off-grid circuits to power the connected AC loads, respectively, according to an embodiment of this invention.

Figure 8:
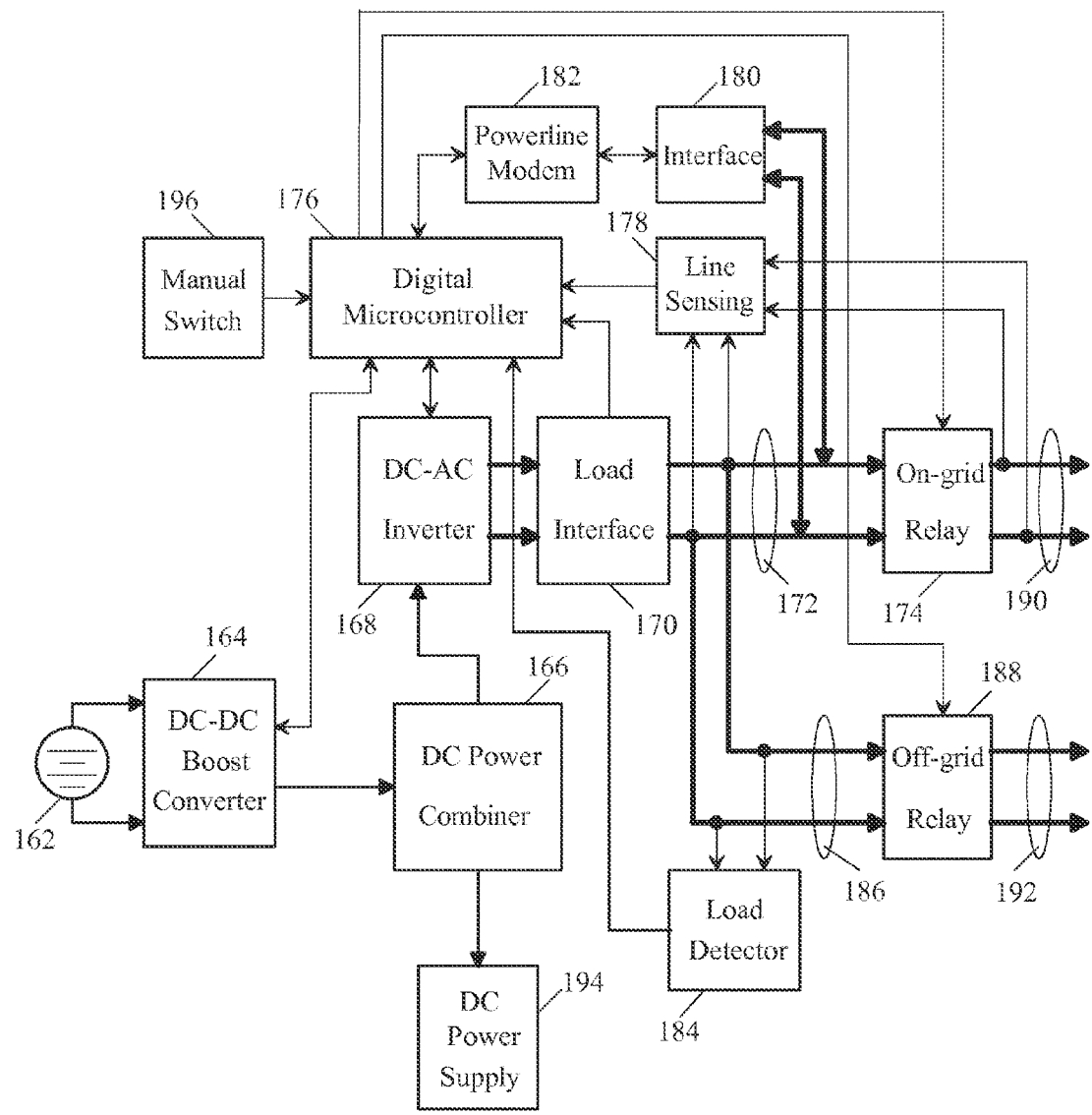

FIG. 8 is a block diagram illustrating a smart single-channel on/off-grid power inverter that inverts the DC power from one DC source to AC power and supplies the AC power either through its on-grid AC output port or off-grid AC output port, according to an embodiment of this invention.

Figure 9:
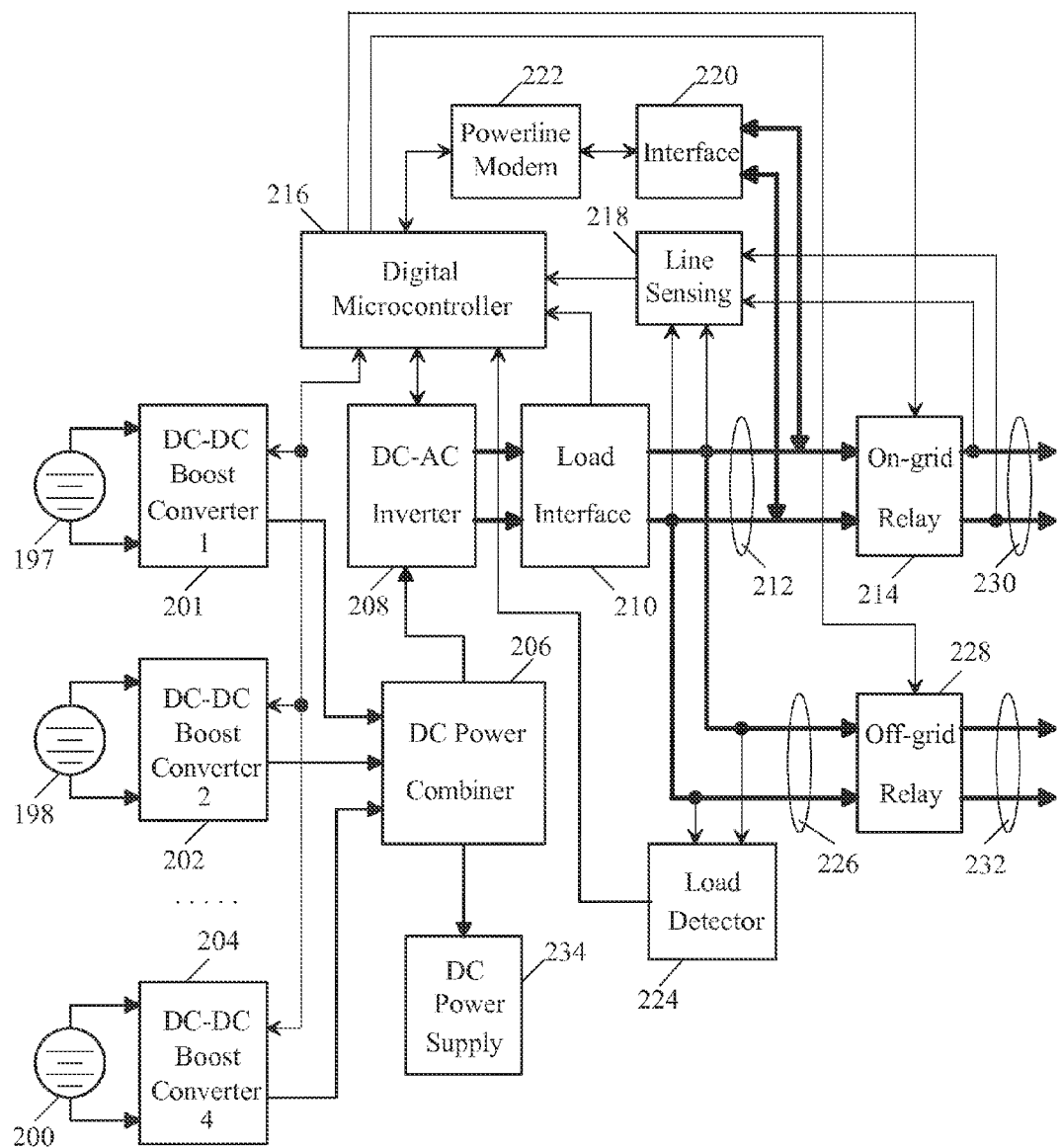

FIG. 9 is a block diagram illustrating a smart 4-channel on/off-grid power inverter that inverts the DC power from four DC sources to AC power and supplies the AC power either through its on-grid AC output port or off-grid AC output port, according to an embodiment of this invention.

Figure 10:
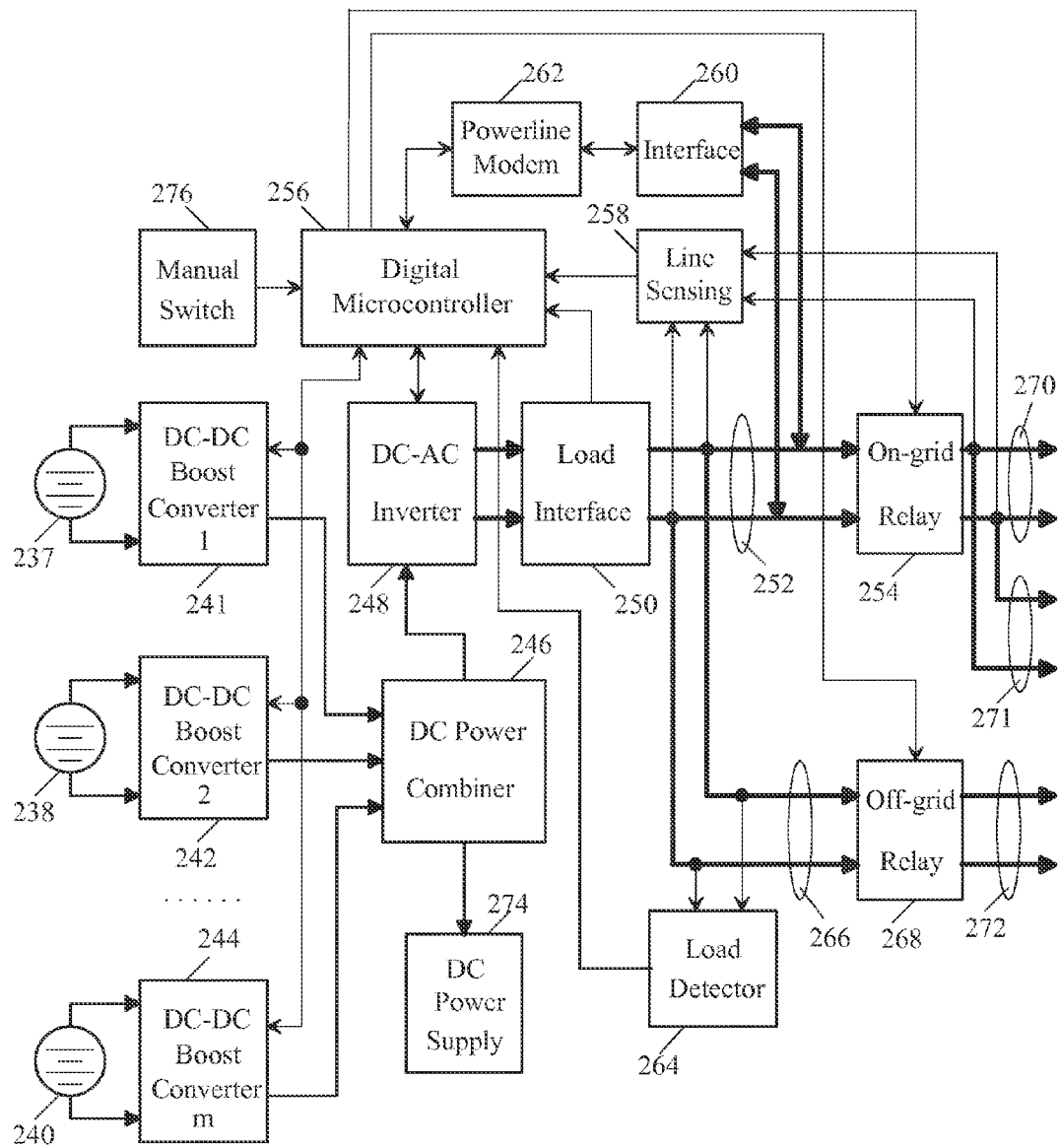

FIG. 10 is a block diagram illustrating a smart m-channel on/off-grid power inverter that inverts the DC power from m DC sources to AC power and supplies the AC power either through its on-grid AC output port or off-grid AC output port, according to an embodiment of this invention.

Figure 11:
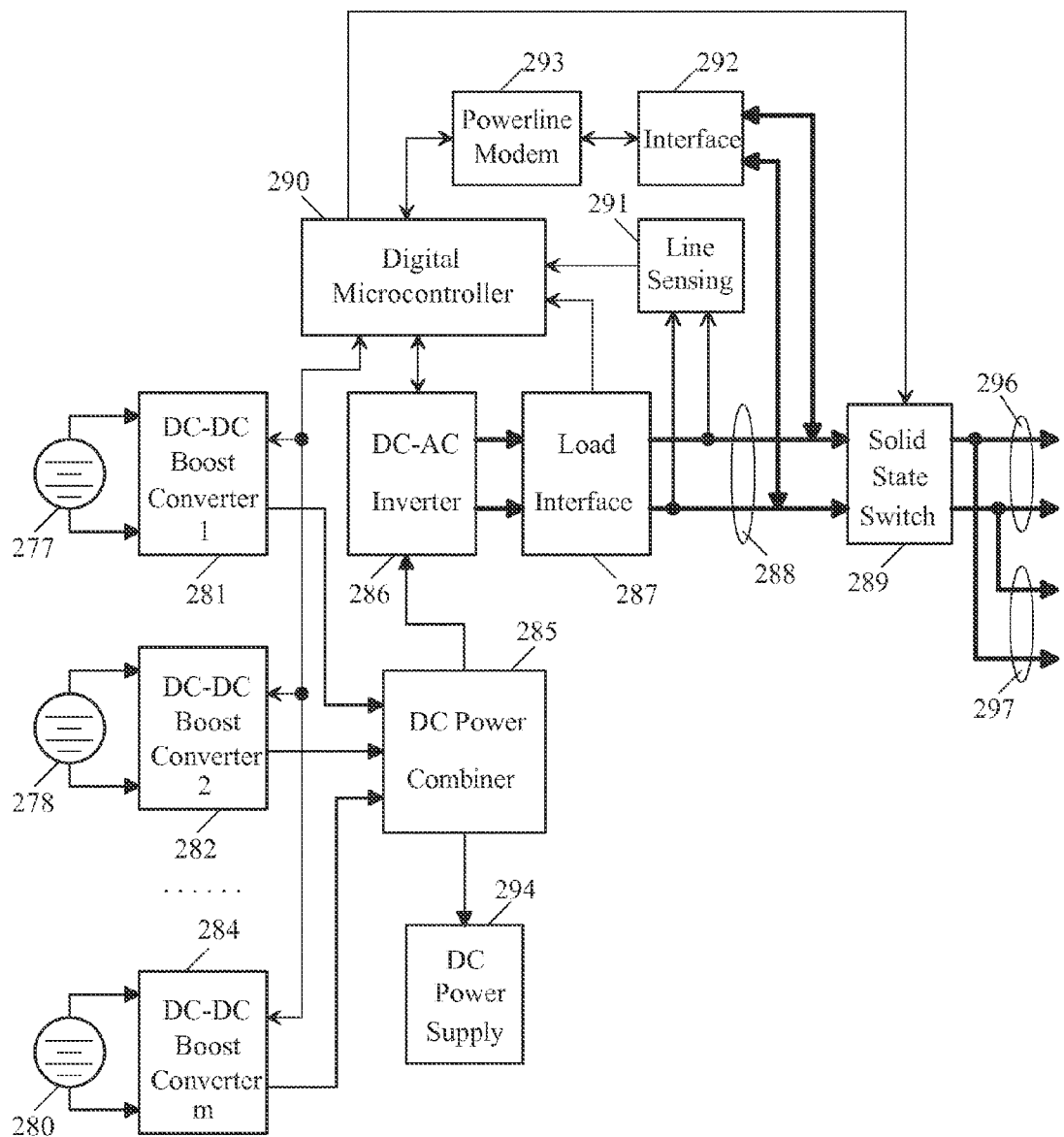

FIG. 11 is a block diagram illustrating a smart m-channel on-grid power inverter that inverts the DC power from m DC sources to AC power to be sent to the electric grid, where the inverter's external AC powerline shows 2 pairs of AC wires.

Figure 12:
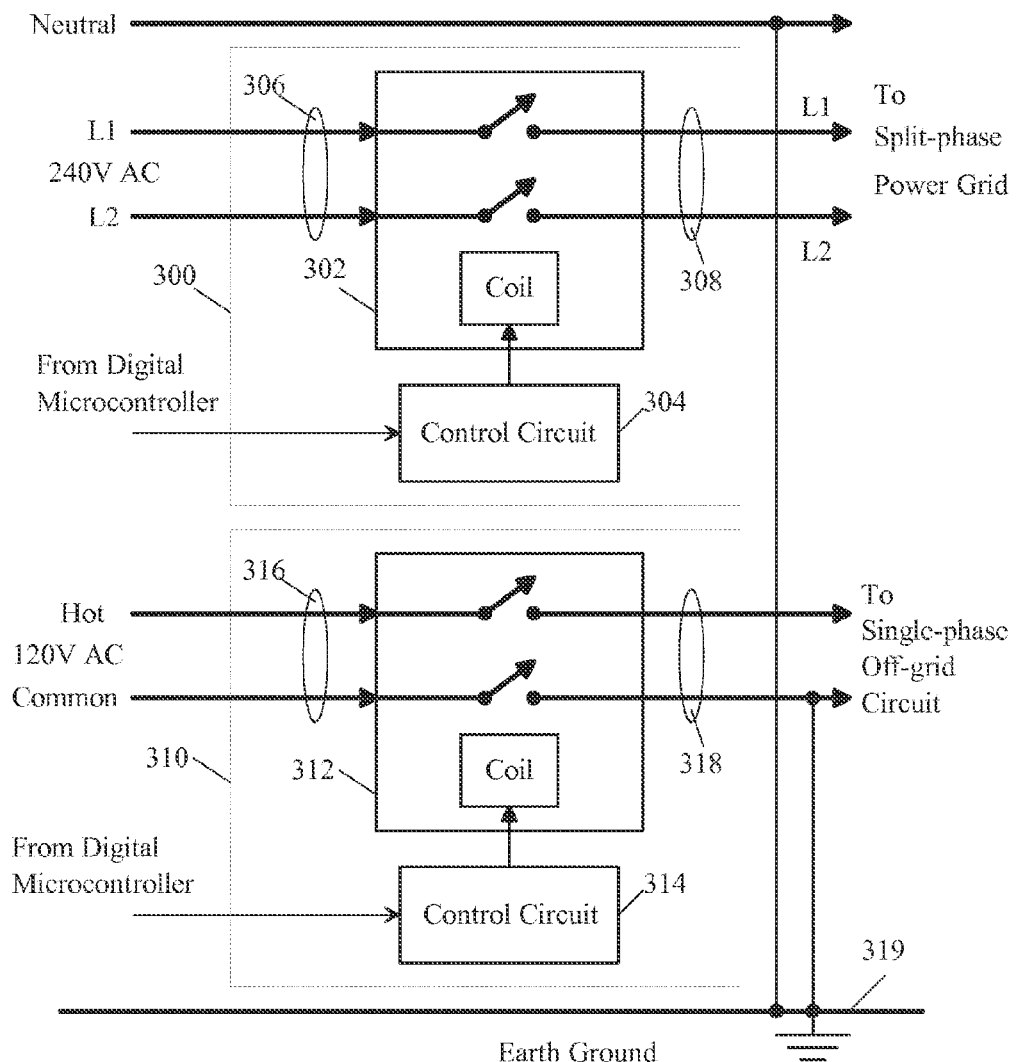

FIG. 12 is a block diagram illustrating an on/off-grid power inverter's on-grid AC output port to supply AC power to an electric grid with split-phase AC, and inverter's off-grid AC output port to supply AC power to single-phase AC loads, according to an embodiment of this invention.

Figure 13:
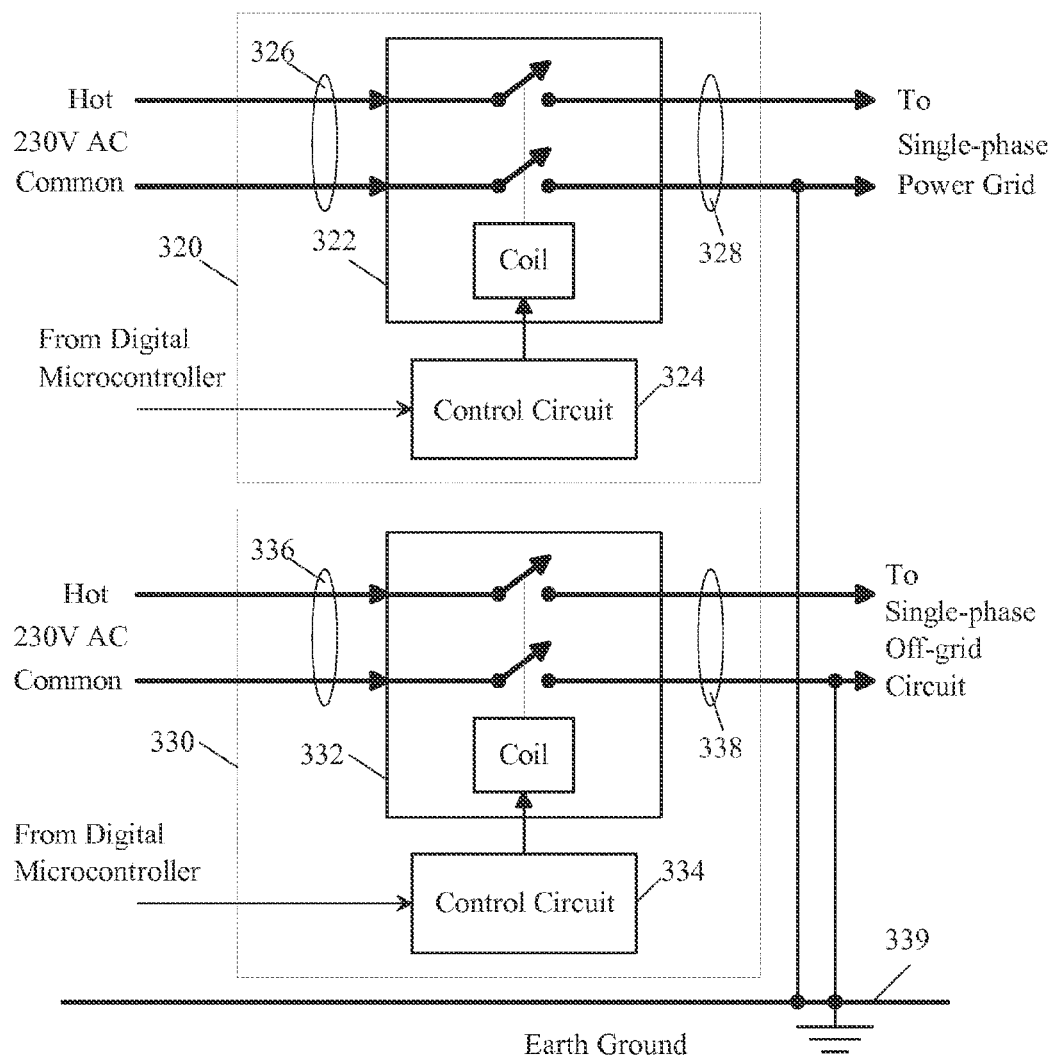

FIG. 13 is a block diagram illustrating an on/off-grid power inverter's on-grid AC output port to supply AC power to a single-phase AC power grid, and inverter's off-grid AC output port to supply AC power to single-phase AC loads, according to an embodiment of this invention.

Figure 14:
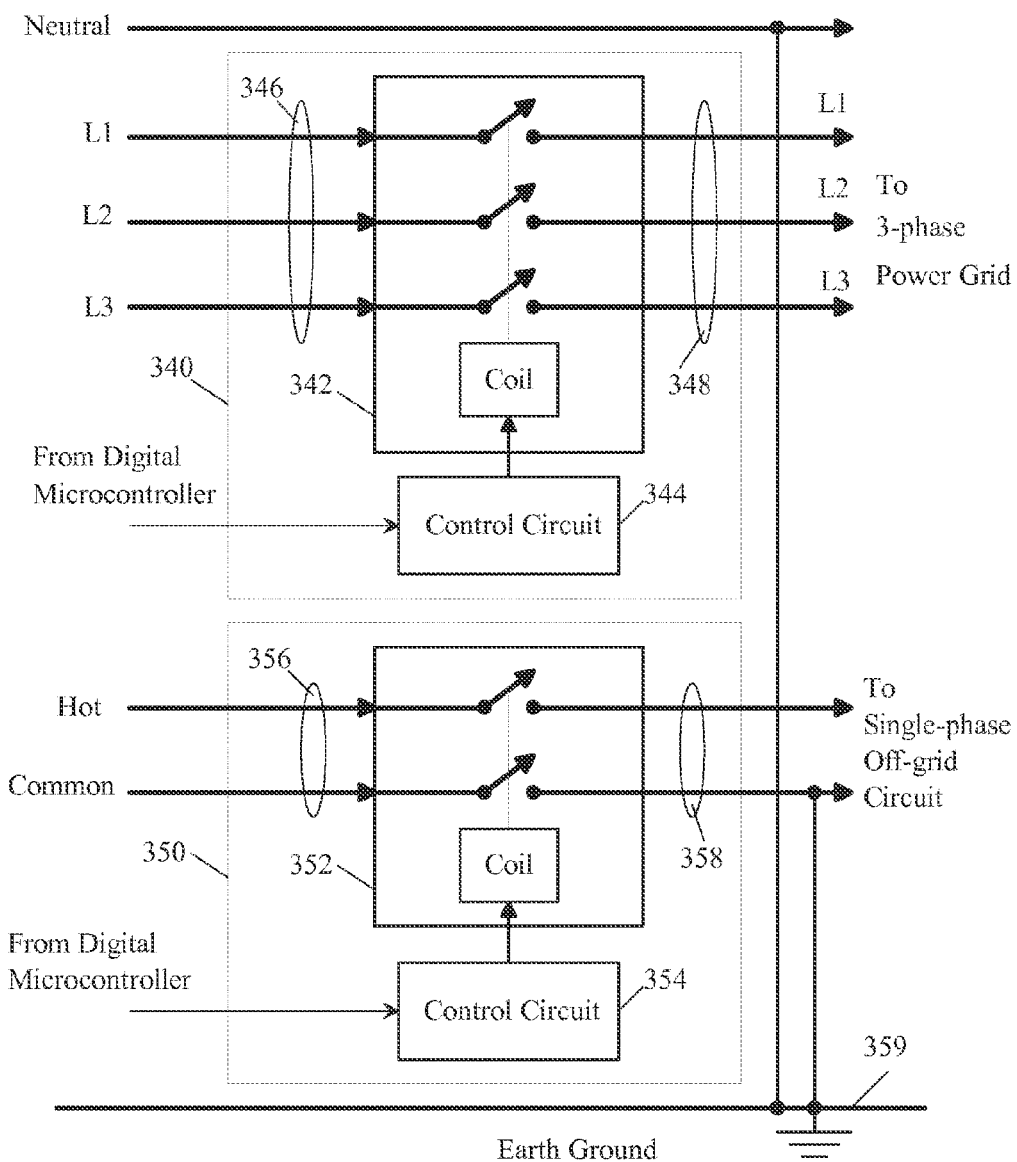

FIG. 14 is a block diagram illustrating an on/off-grid power inverter's on-grid AC output port to supply AC power to a three-phase AC power grid, and inverter's off-grid AC output port to supply AC power to single-phase AC loads, according to an embodiment of this invention.

Figure 15:
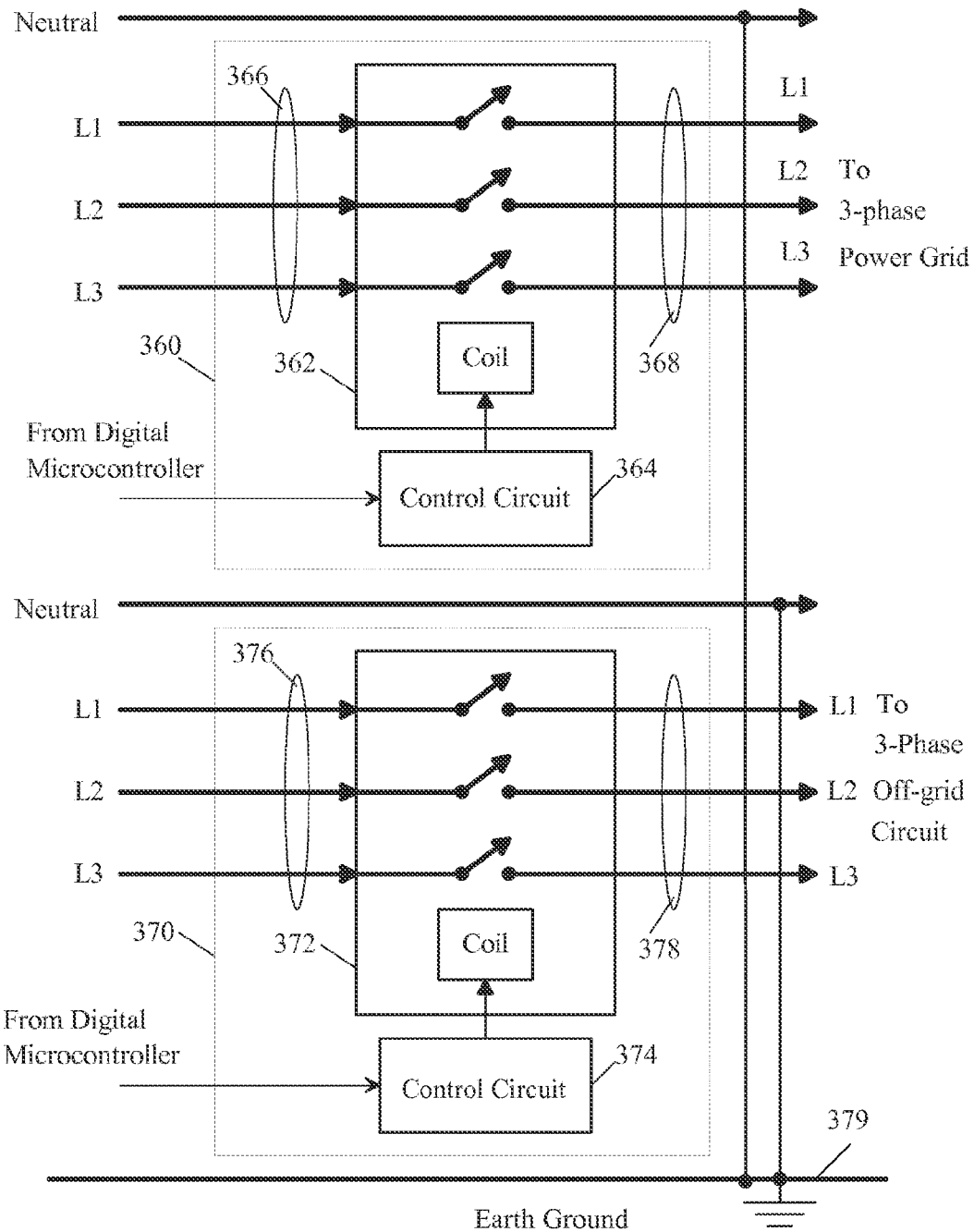

FIG. 15 is a block diagram illustrating an on/off-grid power inverter's on-grid AC output port to supply AC power to a three-phase AC power grid, and inverter's off-grid AC output port to supply AC power to three-phase AC loads, according to an embodiment of this invention.

The term "mechanism" is used herein to represent hardware, software, or any combination thereof. The term "solar panel" or "solar module" refers to photovoltaic (PV) solar modules. The term "AC load" is used herein to represent one or more single-phase or three-phase electrical devices including but not limited to motors, pumps, fans, lights, appliances, and homes.

Throughout this document, m=1, 2, 3, . . . , as an integer, which is used to indicate the number of the DC input ports of an inverter. The term "input channel" refers to the DC input port of the inverter. Then, an m-channel inverter means that the inverter has m input channels or m DC input ports. The term "m-channel inverter" refers to an inverter that has m input channels, where m=1, 2, 3, . . . , as an integer.

Throughout this document, a DC source can be in any one of the following forms including a solar panel or a set of solar panels combined in series and/or parallel, a battery or a set of batteries combined in series and/or parallel, a fuel cell or a set of fuel cells combined in series and/or parallel, a wind generator, and other types of DC power generators.

Throughout this document, if a power inverter is used to generate single-phase AC, it can also be applied to three-phase AC without departing from the spirit or scope of our invention. If a solar inverter is used to generate three-phase AC, it can also be applied to single-phase AC without departing from the spirit or scope of our invention. The AC power and related electric grid and AC load can be either single-phase, split-phase, or three-phase.

Without losing generality, all numerical values given in this patent are examples. Other values can be used without departing from the spirit or scope of our invention. The description of specific embodiments herein is for demonstration purposes and in no way limits the scope of this disclosure to exclude other not specially described embodiments of this invention.

DESCRIPTION

While this patent is being written, the world is experiencing climate changes that are impacting our lives. Changes in temperature, precipitation, and sea level have caused more frequent and severe hurricanes in summer and snowstorms in winter shutting down power grids for hours and even weeks. Since the infrastructure of our society is built upon electricity, losing grid power causes significant disruption and hardship to the lives to which we have become accustom.

Power backup systems are used to power key electrical devices and appliances. Traditionally, diesel generators are used for such power backup systems. They work reasonably well but are noisy, costly to run, and cause air pollution. Solar power backup systems are getting more popular because they offer a green energy solution with no noise. However, one major shortcoming of a solar power backup system is that the solar power is wasted when the grid is on. This is because the off-grid power inverters used in backup systems are designed to power AC loads, which cannot send power to the grid. On the other hand, on-grid solar inverters are required to shutdown within a fraction of a second when the grid is down to keep the grid safe. These on-grid inverters are designed to deliver power to the grid and cannot power AC loads, and therefore cannot be used for solar power backup systems.

In this patent, smart and grid-flexible power inverters are disclosed that can work in either the on-grid or off-grid mode, and switch back and forth between the two modes automatically depending on the power grid conditions. This means that the same solar power system can generate solar power to the grid and can also be a power backup system when the grid is down. The solar power systems enabled by the smart and grid-flexible power inverters can be a useful and cost-effective solution for areas where frequent power outages and long downtimes are common.

Figure 1:
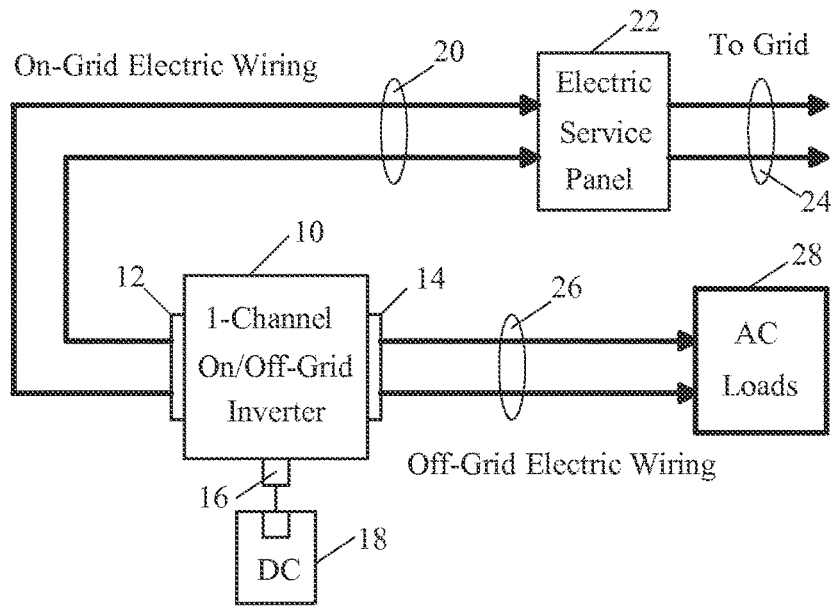
FIG. 1 is a block diagram illustrating a grid-flexible power inversion and optimization system where one single-channel on/off-grid power inverter inverts the DC power from one DC source to AC power, and either sends AC power to the electric grid or to an off-grid AC circuit to power AC loads, according to an embodiment of this invention.

FIG. 1 is a block diagram illustrating a grid-flexible power inversion and optimization system where one single-channel on/off-grid power inverter inverts the DC power from one DC source to AC power, and either sends AC power to the electric grid or to an off-grid AC circuit to power AC loads, according to an embodiment of this invention.

The system comprises a single-channel on/off-grid power inverter 10, a DC power source such as a solar panel 18, an inverter's on-grid AC power output port 12, an inverter's off-grid AC power output port 14, an inverter's DC input channel 16, an on-grid AC powerline 20, a power service panel 22, a power grid 24, an off-grid AC powerline 26, and AC loads 28. The power inverter 10 connects to the DC power source 18 through its DC input channel 16. This is a simple case of a grid-flexible DC to AC power inversion and optimization system, where the on/off-grid power inverter takes DC power from the DC power source, inverts the DC power to AC power, outputs the AC power to the power grid 24 via the AC powerline 20 and the power service panel 22 while the grid is on, or outputs the AC power to power the AC loads 28 via the AC powerline 26 while the grid is down.

The DC source for the power inverter can be in any one of the following forms including a solar panel or a set of solar panels combined in series and/or parallel, a battery or a set of batteries combined in series and/or parallel, a fuel cell or a set of fuel cells combined in series and/or parallel, and a wind generator. The AC power and related electric grid and AC load in this embodiment and in the embodiments to be described in FIGS. 2 to 7 can be single-phase, split-phase, or 3-phase. The 2 AC wires in the drawing are there to show the concept and method.

Figure 2:
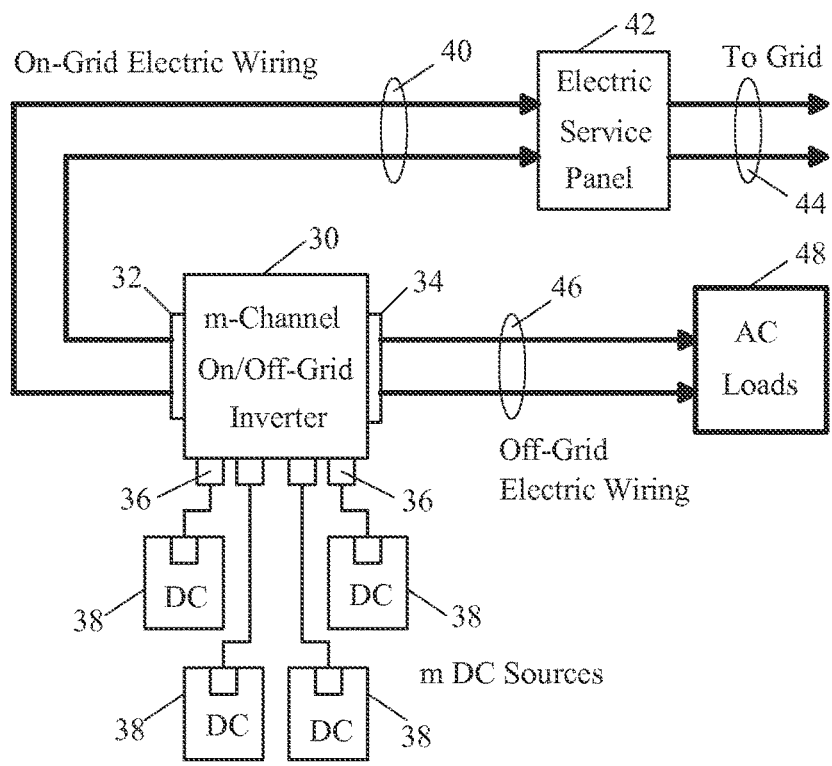
FIG. 2 is a block diagram illustrating a grid-flexible power inversion and optimization system where one m-channel on/off-grid power inverter inverts the DC power from multiple DC sources to AC power, and either sends AC power to the electric grid or to an off-grid AC circuit to power AC loads, according to an embodiment of this invention.

FIG. 2 is a block diagram illustrating a grid-flexible power inversion and optimization system where one m-channel on/off-grid power inverter inverts the DC power from multiple DC sources to AC power, and either sends AC power to the electric grid or to an off-grid AC circuit to power AC loads, according to an embodiment of this invention.

The system comprises a m-channel on/off-grid power inverter 30, m DC power sources such as solar panels 38, an inverter's on-grid AC power output port 32, an inverter's off-grid AC power output port 34, inverter's multiple DC input channels 36, an on-grid AC powerline 40, a power service panel 42, a power grid 44, an off-grid AC powerline 46, and AC loads 48. The power inverter 30 connects to the DC power sources 38 through its DC input channels 36, respectively. In this grid-flexible DC to AC power inversion and optimization system, the on/off-grid power inverter takes DC power from multiple DC power sources, inverts the DC power to AC power, outputs the AC power to the power grid 44 via the AC powerline 40 and the power service panel 42 while the grid is on, or outputs the AC power to power the AC loads 48 via the AC powerline 46 while the grid is down.

FIG. 3 is a block diagram illustrating a grid-flexible power inversion and optimization system where 2 or more single-channel on/off-grid power inverters are arranged as a group, each of the inverters inverts the DC power from one DC source to AC power, where the combined AC power from all inverters is either sent to the electric grid or to an off-grid AC circuit to power AC loads, according to an embodiment of this invention.

The system comprises 2 or more single-channel on/off-grid power inverters 50, each of which has one DC power input channel 56 that is connected to a corresponding DC power source 58, respectively. Each power inverter 50 comprises an on-grid AC power output port 52 and an off-grid AC power output port 54. The on-grid AC outputs from all power inverters are combined in parallel with an on-grid AC powerline 60, and the off-grid AC outputs from all power inverters are combined in parallel with an off-grid AC powerline 66. The system also comprises a power service panel 62, a power grid 64, and AC loads 68.

In this system, each on/off-grid power inverter takes DC power from its corresponding DC power source, inverts the DC power to AC power, and outputs the AC power through either the on-grid AC output port or off-grid AC output port depending on the grid condition. When the grid is on, the combined AC power from all inverters is sent to the power grid 64 via the AC powerline 60 and the power service panel 62. When the grid is down, the combined AC power from all inverters powers the AC loads 68 via the AC powerline 66.

FIG. 4 is a block diagram illustrating a grid-flexible power inversion and optimization system where 2 or more m-channel on/off-grid power inverters are arranged as a group, each of the inverters inverts the DC power from m DC sources to AC power, where the combined AC power from all inverters is either sent to the electric grid or to an off-grid AC circuit to power AC loads, according to an embodiment of this invention.

Without losing generality, the system comprises 2 or more m-channel on/off-grid power inverters 70, each of which has m DC power input channels 76 that are connected to m corresponding DC power sources 78, respectively. Each power inverter 70 comprises an on-grid AC power output port 72 and an off-grid AC power output port 74. The on-grid AC outputs from all power inverters are combined in parallel with an on-grid AC powerline 80, and the off-grid AC outputs from all power inverters are combined in parallel with an off-grid AC powerline 86. The system also comprises a power service panel 82, a power grid 84, and AC loads 88.

In this system, each on/off-grid power inverter takes DC power from its corresponding DC power sources, inverts the DC power to AC power, and outputs the AC power through either the on-grid AC output port or off-grid AC output port depending on the grid condition. When the grid is on, the combined AC power from all inverters is sent to the power grid 84 via the AC powerline 80 and the power service panel 82. When the grid is down, the combined AC power from all inverters powers the AC loads 88 via the AC powerline 86.

In this design, m=1, 2, 3, . . . , as an integer, which is used to indicate the number of DC sources and the DC input channels of the inverter. The DC source for each input channel can be in any one of the following forms including a solar panel or a set of solar panels combined in series and/or parallel, a battery or a set of batteries combined in series and/or parallel, a fuel cell or a set of fuel cells combined in series and/or parallel, and a wind generator.

FIG. 5 is a block diagram illustrating a combined on-grid and grid-flexible power inversion and optimization system where 2 or more m-channel on-grid power inverters and one m-channel on/off-grid power inverter daisy-chain to form a group, each of the inverters inverts the DC power from m DC sources to AC power, where the combined AC power from the on-grid outputs of all inverters is sent to the electric grid when the grid is on, and when the grid is down, AC power from the off-grid output of the on/off-grid power inverter is sent to an off-grid AC circuit to power AC loads, according to an embodiment of this invention.

Without losing generality, the system comprises 2 or more m-channel on-grid power inverters 90 and one on/off-grid power inverter 91, each of which has m DC power input channels 96 or 97 that are connected to m corresponding DC power sources 98 or 99, respectively.

The m-channel on-grid power inverters are disclosed in U.S. Pat. No. 8,786,133 and subsequent patent applications. Each on-grid power inverter 90 comprises an on-grid AC power output port 92 and an on-grid AC power input port 94. The on-grid power inverters can daisy chain, where the AC output port of an inverter connects to the AC input port of the next inverter, and so on. The first power inverter's AC input port is left open, and the last power inverter's AC output port is connected to an AC power service panel so that the generated AC power can be sent to the power grid. This method greatly simplifies the wiring job when installing a PV solar power system.

Although we say the power inverters daisy chain, where the AC output port of each power inverter is connected to the AC input port of the next power inverter, the actual connection of the inverters is pass-through. That means, the generated AC power from each power inverter is added in parallel onto the AC powerline.

The on/off-grid power inverter 91 comprises an on-grid AC power output port 93 and an off-grid AC power output port 95. Its on-grid AC output port 93 can be daisy-chained with the AC input port 94 of the first on-grid power inverter 90. This way, all the inverters are daisy-chained through the on-grid AC powerline 100. The off-grid AC output port 95 of the on/off-grid power inverter 91 is connected to an off-grid AC powerline 106 to form an off-grid AC circuit.

In this combined on-grid and grid-flexible DC to AC power inversion and optimization system, each power inverter takes DC power from its corresponding DC power sources, inverts the DC power to AC power. When the grid is on, the combined AC power from all inverters 90 and 91 is sent to the power grid 104 via the AC powerline 100 and the power service panel 102. When the grid is down, the AC power from the off-grid AC output port of the on/off-grid power inverter 91 powers the AC loads 108 via the AC powerline 106.

FIG. 6 is a block diagram illustrating a grid-flexible power inversion and optimization system where 2 or more m-channel on/off-grid power inverters daisy-chain to form a group, each of the inverters inverts the DC power from m DC sources to AC power, where the combined AC power from the on-grid outputs of all inverters is sent to the electric grid when the grid is on, and when the grid is down, AC power from the off-grid output of each of the inverters powers its corresponding connected AC loads, according to an embodiment of this invention.

Without losing generality, the system comprises 2 or more m-channel on/off-grid power inverters 110, each of which has m DC power input channels 116 that are connected to m corresponding DC power sources 118, respectively. Each power inverter 110 comprises an on-grid AC power input port 113 or 115, an on-grid AC power output port 111 or 112, and an off-grid AC power output port 114. The on/off-grid power inverters can daisy chain, where an inverter's on-grid AC output port 112 connects to the next inverter's on-grid AC input port 113, and so on. The first inverter's on-grid AC input port 115 is left open, and the last inverter's on-grid AC output port 111 is connected to an AC power service panel 122 so that the generated AC power can be sent to the power grid 124. Although we say the on/off-grid power inverters daisy chain, where the on-grid AC output port of each inverter is connected to the on-grid AC input port of the next inverter, the actual AC connection of inverters is in parallel or pass-through. That means, all on-grid AC outputs are combined in parallel with an on-grid AC powerline 120 that is connected to the grid 124 through the electric service panel 122.

The off-grid AC output port 114 of each power inverter is connected to an off-grid AC powerline 126 individually to form multiple off-grid AC circuits. The system also comprises a power service panel 122, a power grid 124, and multiple AC loads 128.

In this system, each on/off-grid power inverter takes DC power from its corresponding DC power sources, inverts the DC power to AC power, and outputs the AC power through either the on-grid AC output or off-grid AC output depending on the grid condition. When the grid is on, the combined AC power from all inverters is sent to the power grid 124 via the AC powerline 120 and the power service panel 122. When the grid is down, the AC power from the off-grid AC output of each inverter powers its corresponding AC loads 128 via the AC powerline 126, respectively.

This design shows that the on-grid AC outputs of all on/off-grid power inverters can be combined in parallel with a daisy-chain design using appropriate AC wires and connectors to make the installation more user-friendly. On the other hand, each on/off-grid power inverter can form and support its own off-grid AC circuit to power AC loads separately. Having multiple individually supported off-grid circuits can be useful in real applications.

FIG. 7 is a block diagram illustrating a grid-flexible power inversion and optimization system where 2 or more m-channel on/off-grid power inverters are arranged as a group, each of the inverters inverts the DC power from m DC sources to AC power, where the combined AC power from the on-grid outputs of all inverters is sent to the electric grid when the grid is on, and when the grid is down, single or multiple off-grid outputs from their corresponding inverters are combined to form 2 or more off-grid circuits to power the connected AC loads, respectively, according to an embodiment of this invention.

Without losing generality, the system comprises 2 or more m-channel power inverters 130 and 131, each of which has m DC power input channels 136 or 137 that are connected to m corresponding DC power sources 138 or 139, respectively. Each power inverter 130 comprises an on-grid AC power output port 132 and an off-grid AC power output port 134. Each power inverter 131 comprises an on-grid AC power output port 133 and an off-grid AC power output port 135. The on-grid AC outputs from all power inverters 130 and 131 are combined in parallel with an on-grid AC powerline 140. The off-grid AC outputs from all power inverters 130 are combined in parallel with an off-grid AC powerline 146. The off-grid AC outputs from all power inverters 131 are combined in parallel with an off-grid AC powerline 147. To simplify the drawing, FIG. 7 shows only one power inverter 131, although there can be multiple power inverters 131. The system also comprises a power service panel 142, a power grid 144, AC loads 148 and 149.

In this system, each on/off-grid power inverter takes DC power from its corresponding DC power sources, inverts the DC power to AC power, and outputs the AC power through either the on-grid AC output or off-grid AC output depending on the grid condition. When the grid is on, the combined AC power from all inverters 130 and 131 is sent to the power grid 144 via the AC powerline 140 and the power service panel 142. When the grid is down, the combined AC power from all inverters 130 powers the AC loads 148 via the AC powerline 146, and the combined AC power from all inverters 131 powers the AC loads 149 via the AC powerline 147.

This design shows that the on-grid outputs of all inverters can be combined in parallel to send the combined total AC power to the grid. On the other hand, two or more off-grid AC power circuits can be formed by combining the off-grid AC outputs from one or multiple on/off-grid power inverters separately. Having multiple off-grid circuits with different power levels can be useful in real applications in order to deal with AC loads that have different power levels and requirements.

FIG. 8 is a block diagram illustrating a smart single-channel on/off-grid power inverter that inverts the DC power from one DC source to AC power and supplies the AC power either through its on-grid AC output port or off-grid AC output port, according to an embodiment of this invention.

The smart single-channel on/off-grid power inverter comprises a DC-DC boost converter 164, a DC power combiner 166, a DC-AC inverter 168, a load interface circuit 170, an internal on-grid AC powerline 172, an on-grid electric relay 174, a digital microcontroller 176, a line sensing circuit 178, an interface circuit for powerline communications 180, a powerline communications Modem 182, a load detector 184, an internal off-grid AC powerline 186, an off-grid electric relay 188, an external on-grid AC powerline 190, an external off-grid AC powerline 192, a DC power supply 194, and a 3-position manual switch 196. The external on-grid AC powerline 190 is connected to an electric grid, and the external off-grid AC powerline 192 is connected to an off-grid AC circuit.

The on-grid electric relay 174 controlled by the microcontroller 176 is used to isolate the internal on-grid AC powerline 172 from the external on-grid AC powerline 190. The off-grid electric relay 188 controlled by the microcontroller 176 is used to isolate the internal off-grid AC powerline 186 from the external off-grid AC powerline 192. The internal on-grid AC powerline 172 and internal off-grid AC powerline 186 are connected. However, the AC voltage on the internal powerline 172 and 186 is dependent on whether the inverter is running in the on-grid or off-grid mode. For instance, in the on-grid mode, the internal powerline 172 is 240V, which matches the grid voltage in the U.S. In the off-grid mode, the internal powerline 186 is 120V which is the rated off-grid AC output voltage for the inverter to power 120V AC loads.

During normal operating conditions, the power from DC source 162 is delivered to the DC-DC boost converter 164 and goes through a DC power combiner 166. Then, the DC power is inverted by the DC-AC inverter 168 to AC power. In the on-grid mode, the inverted AC voltage is higher than the incoming AC voltage from the electric grid. The generated AC power goes through the load interface circuit 170 to be combined with the AC power in the internal AC powerline 172. A line sensing circuit 178 connected to the internal AC powerline 172 is used to detect the phase and zero-crossing point of the incoming AC power from the power grid. The phase and zero-crossing point signals are sent to the microcontroller 176 for AC power synchronization to assure that the power inverter provides high quality synchronized power to the grid. The line sensing circuit 178 is also connected to the external AC powerline 190 to detect the power grid status. This signal is useful when the on-grid electric relay 174 is open and the grid status cannot be detected from the internal AC powerline 172. In the off-grid mode, the inverted AC voltage is regulated based on the rated off-grid output voltage of the power inverter. A smart and scalable off-grid power inverter is disclosed in the U.S. patent application Ser. No. 13/493,622, to power electrical devices including lights, fans, TVs, computers, battery chargers, refrigerators, motors, pumps, and home appliances.

The 3-position manual switch 196 and the one to be described in FIG. 10 are used to select the power inverter to work in the following positions: (1) auto position, (2) on-grid position, and (3) off-grid position. In the auto position, the microcontroller can switch between the on-grid and off-grid mode based on the grid condition. In the on-grid position, the power inverter will work as an on-grid inverter. When the grid is down, it will not switch to the off-grid mode. It must be switched to the off-grid mode manually in order for the inverter to generate power to the AC load. In the off-grid position, the inverter will work like an off-grid inverter regardless of the power grid condition. It must be switched to the on-grid mode manually in order for the inverter to generate power to the grid.

The 3-position manual switch 196 is connected to the microcontroller 176 through signal lines to inform the microcontroller of the selected position. For example, the system can be designed to use 0V, 2.5V, and 3.3V DC signals to switch among the (1) auto position, (2) on-grid position, and (3) off-grid position, respectively.

As a case example in the following, we assume the inverter is selected in the auto position. During the start-up period, the inverter is not generating power, and both electric relays 174 and 188 are open. The microcontroller 176 first detects if there is grid power from the line sensing circuit 178 connected to the external on-grid AC powerline 190. If there is grid power, the microcontroller 176 will switch the inverter to the on-grid mode. It will then start the inverter's startup sequence, wait for the 5-minute mandatory waiting period, and then generate AC power to be sent to the grid.

During the on-grid mode, the on-grid electric relay 174 is closed and off-grid electric relay 188 is open. The microcontroller 176 keeps detecting if there is grid power from the line sensing circuit 178 connected to the internal on-grid AC powerline 172. If there is grid power, it will continue to send power to the grid. As soon as it detects the grid is down, it will stop generating power within a fraction of a second based on the UL1741 requirement. Then, the microcontroller sends a signal to disconnect the on-grid electric relay 174. After waiting for a few seconds, the microcontroller sends a signal to connect the off-grid electric relay 188. The inverter then starts to send a test signal through the internal off-grid powerline 186 and external off-grid powerline 192 to a connected off-grid AC circuit to check: (1) if there is AC present in the off-grid circuit, and (2) if there is an AC load in the off-grid circuit. If there is no AC present and an AC load is detected, it will start to generate AC power to power the load. Now, the inverter is working in the off-grid mode.

The load detector 184 as well as the ones to be described in FIGS. 9 and 10 are electronic circuits that can detect the impedance of the connected AC load. If no AC power is detected on the off-grid AC powerline, the load detector checks the impedance of the off-grid AC powerline to determine if the connected AC load is within certain specifications. The load detector in the embodiments herein can be designed using standard LRC meter impedance measurement circuits and mechanism such as those described in the book, "The measurement of Lumped Parameter Impedance: A Metrology Guide" published by University of Michigan Library in January 1974.

During the off-grid mode, the on-grid electric relay 174 is open and off-grid electric relay 188 is closed. The microcontroller 176 is constantly detecting if there is grid power from the line sensing circuit 178 connected to the external on-grid AC powerline 190. After grid power is detected, the inverter will wait for a few minutes to assure the grid is stable. When the manual switch 196 is set in the auto position, the inverter is designed to go back to the on-grid mode automatically; it will first stop generating power to the off-grid circuit. After the microcontroller assures that power generation is halted, it will send a signal to disconnect the off-grid electric relay 188. Then, the microcontroller sends a signal to connect the on-grid electric relay 174. After a 5-minute mandatory waiting period, the inverter starts to generate AC power to be sent to the power grid. Now, the inverter is working in the on-grid mode.

The on-grid electric relays and off-grid electric relays to be described in FIGS. 9 and 10 work the same way as described here.

A powerline communications Modem 182, which is isolated by an interface circuit 180, is used to establish a 2-way digital signal communication between the microcontroller 176 and the outside world through the AC powerline. The internal DC power supply 194 takes DC power from the DC power combiner 166 to supply DC power to the internal electronics.

The digital microcontroller 176 is used to perform a number of tasks including (i) monitoring the DC boost voltage from the DC-DC boost converter, (ii) controlling the DC-DC boost converter, (iii) measuring input voltage and current, and calculating DC input power for the input channel, (iv) performing maximum power point tracking (MPPT) for each solar panel, if the connected DC source is a solar panel, (v) performing DC-AC inversion, AC power synchronization, and AC output current control, (vi) monitoring AC current and voltage for generated power amount and status, (vii) performing powerline communications, (viii) performing logic controls such as AC powerline switching and isolation, (ix) detecting the power grid status, (x) detecting off-grid AC circuit status, (xi) switching between on-grid and off-grid mode based on the setting of the 3-position manual switch, and (xii) regulating AC output voltage when working in the off-grid mode.

The digital microcontroller 176 as well as those to be described in FIGS. 9, 10 and 11 are small computers on a single integrated circuit (IC) or a set of ICs that consists of a central processing unit (CPU) combined with functions and peripherals including a crystal oscillator, timers, watchdog, serial and analog I/Os, memory modules, pulse-width-modulation (PWM) generators, and user software programs. A 32-bit high-performance floating-point microcontroller is selected for this application. The digital microcontroller performs real-time control and optimization functions for the on/off-grid power inverter, in which Model-Free Adaptive (MFA) controllers are used to control the DC-DC boost converter, the inverter's on-grid AC output, and the inverter's off-grid AC output. The MFA optimizers provide maximum power point tracking (MPPT) to allow the power inverter to achieve optimal power production. The MFA control and optimization technologies have been described in U.S. Pat. Nos. 6,055,524, 6,556,980, 7,142,626, 7,152, 052, 7,415,446, 8,594,813, related international patents, and other issued and pending patents.

The AC power and related electric grid and AC load in this embodiment and in the embodiments to be described in FIGS. 9, 10, and 11 can be single-phase, split-phase, or 3-phase. The 2 AC wires in the drawing are there to show the concept and method.

FIG. 9 is a block diagram illustrating a smart 4-channel on/off-grid power inverter that inverts the DC power from four DC sources to AC power and supplies the AC power either through its on-grid AC output port or off-grid AC output port, according to an embodiment of this invention.

The smart 4-channel on/off-grid power inverter comprises four DC-DC boost converters 201, 202, . . . , 204, a DC power combiner 206, a DC-AC inverter 208, a load interface circuit 210, an internal on-grid AC powerline 212, an on-grid electric relay 214, a digital microcontroller 216, a line sensing circuit 218, an interface circuit for powerline communications 220, a powerline communications Modem 222, a load detector 224, an internal off-grid AC powerline 226, an off-grid electric relay 228, an external on-grid AC powerline 230, an external off-grid AC powerline 232, and a DC power supply 234. The external on-grid AC powerline 230 is connected to an electric grid, and the external off-grid AC powerline 232 is connected to an off-grid AC circuit.

The on-grid electric relay 214 controlled by the microcontroller 216 is used to isolate the internal on-grid AC powerline 212 from the external on-grid AC powerline 230. The off-grid electric relay 228 controlled by the microcontroller 216 is used to isolate the internal off-grid AC powerline 226 from the external off-grid AC powerline 232. The internal on-grid AC powerline 212 and internal off-grid AC powerline 226 are connected. However, the AC voltage on the internal powerline 212 and 226 is dependent on whether the inverter is running in the on-grid or off-grid mode.

During normal operating conditions, the power from DC sources 197, 198, . . . , 200 is delivered to the corresponding DC-DC boost converters 201, 202, . . . , 204 respectively. The DC power is then combined in the DC power combiner 206. The combined DC power is then inverted by the DC-AC inverter 208 to AC power. In the on-grid mode, the inverted AC voltage is higher than the incoming AC voltage from the grid. The generated AC power goes through the load interface circuit 210 to be combined with the AC power in the internal AC powerline 212. A line sensing circuit 218 connected to the internal AC powerline 212 is used to detect the phase and zero-crossing point of the incoming AC power from the power grid. The phase and zero-crossing point signals are sent to the microcontroller 216 for AC power synchronization to assure that the power inverter provides high quality synchronized power to the grid. The line sensing circuit 218 is also connected to the external AC powerline 230 to detect the power grid status. In the off-grid mode, the inverted AC voltage is regulated based on the rated off-grid output voltage of the power inverter.

There is no 3-position manual switch in this design to show that the power inverter can be designed to switch between the on-grid and off-grid automatically without human interaction. The operations of the on-grid electric relay 214, off-grid electric relay 228, their corresponding internal and external AC powerlines, and power generation sequences have been described in FIG. 8.

A powerline communications Modem 222, which is isolated by an interface circuit 220, is used to establish a 2-way digital signal communication between the microcontroller 216 and the outside world through the AC powerline. The internal DC power supply 234 takes DC power from the DC power combiner 206 to supply DC power to the internal electronics.

The digital microcontroller 216 and the one to be described in FIG. 10 are used to perform a number of tasks including (i) monitoring the DC boost voltage from each DC-DC boost converter, (ii) controlling the DC-DC boost converters, (iii) measuring input voltage and current, and calculating DC input power for each input channel, (iv) performing maximum power point tracking (MPPT) for each solar panel, if the connected DC source is a solar panel, (v) performing DC-AC inversion, AC power synchronization, and AC output current control, (vi) monitoring AC current and voltage for generated power amount and status, (vii) performing powerline communications, (viii) performing logic controls such as AC powerline switching and isolation, (ix) detecting the power grid status, (x) detecting off-grid AC circuit status, (xi) switching between on-grid and off-grid mode, and (xii) regulating AC output voltage when working in the off-grid mode.

The DC-DC boost converters that can be used in the embodiments herein are any of a number of well known converters described in the "Power Electronics Handbook" edited by Muhammad H. Rashid, published by Academic Press in 2007, including Buck Converter, Boost Converter, Buck-Boost Converter, Super-Lift Luo Converter, and Cascade Boost Converter. The DC-AC inverters that can be used in the embodiments herein are any of a number of well known DC-AC inverters described in the "Power Electronics Handbook" including Half-Bridge Inverter, Full-Bridge Inverter, Bipolar PWM Inverter, Unipolar PWM Inverter, and Sinusoidal PWM Inverter. The DC combiners used in the embodiments herein can be designed with a circuit that allow the output from all DC-DC boost converters to connect in parallel so that all DC currents will be added together. The Powerline Modem that can be used in the embodiments herein can be any of a number of commercially available integrated circuits capable of providing 2-way digital communications through a powerline. Other modules discussed in the embodiments herein including load interface, solid state switch, line sensing circuit, powerline interface circuit, load detector, on-grid relay, off-grid relay, and DC power supply can be implemented using one or more known combinations of conventional electronic components such as resisters, capacitors, inductors, solid-state switches, transformers, diodes, transistors, operational amplifiers, and ceramic filters, etc.

The function of regulating AC output voltage in the off-grid mode is achieved by the digital microcontroller with its supporting circuits and software to perform the following: (i) measuring the AC output voltage in real-time; (ii) comparing it with the rated AC output voltage setpoint such as 120V; and (iii) adjusting the AC output current or output power until the output voltage is regulated around its setpoint within a specified deadband. More specifically, if the AC output voltage is higher than its setpoint, the microcontroller will reduce the output current by decreasing the duty-cycle of the pulse-width-modulation (PWM) of the DC-DC boost converter. If the AC output voltage is lower than its setpoint, it will increase the duty-cycle of PWM to increase the AC output current. If the AC output voltage is within the deadband of its setpoint such as 120V+/−1V, the microcontroller will not make PWM duty-cycle adjustments to keep the AC output current and AC output power stable. Based on the Ohm's Law, the AC output voltage is in proportion of the AC output current so that it can be regulated accordingly.

If the power inverter is used for solar power applications, the available DC input power from each input channel will vary due to sunlight variations. On the other hand, the total AC loads may change quickly and frequently as well. The automatic control system to regulate inverter's output voltage for the on/off-grid power inverter in the off-grid mode can be difficult to implement. The Model-Free Adaptive (MFA) controllers described in U.S. Pat. Nos. 6,055,524, 6,556,980, and subsequent patents are implemented in the digital microcontroller to achieve robust control performance for AC output voltage regulation.

FIG. 10 is a block diagram illustrating a smart m-channel on/off-grid power inverter that inverts the DC power from m DC sources to AC power and supplies the AC power either through its on-grid AC output port or off-grid AC output port, according to an embodiment of this invention.

The smart m-channel on/off-grid power inverter comprises m DC-DC boost converters 241, 242, . . . , 244, a DC power combiner 246, a DC-AC inverter 248, a load interface circuit 250, an internal on-grid AC powerline 252, an on-grid electric relay 254, a digital microcontroller 256, a line sensing circuit 258, an interface circuit for powerline communications 260, a powerline communications Modem 262, a load detector 264, an internal off-grid AC powerline 266, an off-grid electric relay 268, an external on-grid AC powerline 270 and 271, an external off-grid AC powerline 272, a DC power supply 274, and a 3-position manual switch 276. The external on-grid AC powerline 270 and 271 is connected to an electric grid, and the external off-grid AC powerline 272 is connected to an off-grid AC circuit.

The on-grid electric relay 254 controlled by the microcontroller 256 is used to isolate the internal on-grid AC powerline 252 from the external on-grid AC powerline 270 and 271. The off-grid electric relay 268 controlled by the microcontroller 256 is used to isolate the internal off-grid AC powerline 266 from the external off-grid AC powerline 272. The internal on-grid AC powerline 252 and internal off-grid AC powerline 266 are connected. However, the AC voltage on the internal powerline 252 and 266 is dependent on whether the inverter is running in the on-grid or off-grid mode.

FIG. 10 illustrates that the same external AC powerline can have 2 connected pairs of AC wires 270 and 271 to facilitate AC input and AC output ports for daisy-chaining multiple inverters. That is, the AC output port of an inverter connects to the AC input port of the next inverter, and so on. Although we say the inverters daisy chain, the actual connection of inverter's AC powerline is in parallel or pass-through.

The on-grid relay 254, external AC powerline 270, and their supporting circuits can form an on-grid AC output port. The on-grid relay 254, external AC powerline 271, and their supporting circuits can form an on-grid AC input port. In physical design of an on/off-grid power inverter, the AC input port and AC output port can be constructed by using appropriate AC wires and connectors to make the installation more user-friendly. For instance, the AC output port can use a male-type AC connector and the AC input port can use a female-type AC connector, which make a matching pair. This way, the user can easily make the AC connections and avoid potential errors. The drawing of external AC powerline 270 and 271 in FIG. 10 shows the concept of how multiple on/off-grid power inverters can daisy-chain as illustrated in FIG. 6. The drawings in FIGS. 8 and 9 show only two wires for the external AC powerline but the same type of AC input and output ports can be built in a similar way. The drawings in FIGS. 12 to 15 show external AC powerlines and describe on-grid AC output ports. To simplify the drawings, on-grid AC input ports are not shown, but can be implemented the same way.

During normal operating conditions, the power from DC sources 237, 238, . . . , 240 is delivered to the corresponding DC-DC boost converters 241, 242, . . . , 244 respectively. The DC power is then combined in the DC power combiner 246. The combined DC power is then inverted by the DC-AC inverter 248 to AC power. In the on-grid mode, the inverted AC voltage is higher than the incoming AC voltage from the grid. The generated AC power goes through the load interface circuit 250 to be combined with the AC power in the internal AC powerline 252. A line sensing circuit 258 connected to the internal AC powerline 252 is used to detect the phase and zero-crossing point of the incoming AC power from the power grid. The phase and zero-crossing point signals are sent to the microcontroller 256 for AC power synchronization to assure that the power inverter provides high quality synchronized power to the grid. The line sensing circuit 258 is also connected to the external AC powerline 270 to detect the power grid status. In the off-grid mode, the inverted AC voltage is regulated based on the rated off-grid output voltage of the power inverter.

The 3-position manual switch 276 has been described in FIG. 8. It is connected to the microcontroller 256 through signal lines to inform the microcontroller of the selected auto, on-grid, or off-grid positions. The operations of the on-grid electric relay 254, off-grid electric relay 268, their corresponding internal and external AC powerlines, and power generation sequences have been described in FIG. 8.

A powerline communications Modem 262, which is isolated by an interface circuit 260, is used to establish a 2-way digital signal communication between the microcontroller 256 and the outside world through the AC powerline. The internal DC power supply 274 takes DC power from the DC power combiner 246 to supply DC power to the internal electronics.

FIG. 11 is a block diagram illustrating a smart m-channel on-grid power inverter that inverts the DC power from m DC sources to AC power to be sent to the electric grid, where the inverter's external AC powerline shows 2 pairs of AC wires.

The smart m-channel on-grid power inverter comprises m DC-DC boost converters 281, 282, . . . , 284, a DC power combiner 285, a DC-AC inverter 286, a load interface circuit 287, an internal AC powerline 288, a solid state switch 289, a digital microcontroller 290, a line sensing circuit 291, an interface circuit for powerline communications 292, a powerline communications Modem 293, a DC power supply 294, and an external AC powerline 296 and 297.

The m-channel on-grid power inverters are disclosed in U.S. Pat. No. 8,786,133 and subsequent patent applications. FIG. 11 makes it more clear by showing the same external AC powerline can have 2 pairs of AC wires 296 and 297 to facilitate AC input and output ports for daisy-chaining multiple power inverters. That is, the AC output port of an inverter connects to the AC input port of the next inverter, and so on. Although we say the inverters daisy chain, the actual connection of the inverter's AC powerline is in parallel or pass-through. FIG. 11 shows the same external AC powerline has 2 pairs of AC wires 296 and 297 connected in parallel.

In FIG. 11, the solid-state relay 289, external AC powerline 296, and their supporting circuits can form an AC output port. The solid-state relay 289, external AC powerline 297, and their supporting circuits can form an AC input port. In physical design of an on-grid power inverter, the AC input port and AC output port can be constructed by using appropriate AC wires and connectors to make the installation user-friendly. For instance, the AC output port can use a male-type AC connector and the AC input port can use a female-type AC connector, making a matching pair. This way, the user can easily make the AC connections and avoid potential errors. The drawing of the external AC powerline 296 and 297 in FIG. 11 shows the concept of how multiple power inverters can daisy-chain as illustrated in FIG. 5.

FIG. 12 is a block diagram illustrating an on/off-grid power inverter's on-grid AC output port to supply AC power to an electric grid with split-phase AC, and inverter's off-grid AC output port to supply AC power to single-phase AC loads, according to an embodiment of this invention.

In North America and some other parts of the world, split-phase AC standard is used. A split-phase system is also called single-phase three-wire system for electric power distribution. Originated from Thomas Edison's three-wire DC system, the split-phase AC system has some advantages over the single-ended single-phase AC system. For the split-phase system, as an example, the line-to-line (L1 to L2) output voltage is 240V, and the Line-to-Neutral (L1 to N, or L2 to N) is 120V. Therefore, the on/off-grid power inverters to be used in North America must support the split-phase AC for its on-grid AC output and support single-phase AC for its off-grid AC output.

In FIG. 12, the inverter's on-grid AC output port 300 comprises an on-grid electric relay 302, an on-grid control circuit 304, an internal on-grid AC powerline 306, and an external on-grid AC powerline 308. The inverter's off-grid AC output port 310 comprises an off-grid electric relay 312, an off-grid control circuit 314, an internal off-grid AC powerline 316, and an external off-grid AC powerline 318. The external on-grid AC powerline 308 is connected to the L1 and L2 lines of a split-phase power grid. The external off-grid AC powerline 318 is connected with a single-phase off-grid AC circuit. The Neutral line of the split-phase AC that is connected to the power grid and Common line of the single-phase AC of the off-grid circuit are connected to the earth ground 319. The control circuits 304 and 314 are connected to and controlled by a digital microcontroller of the power inverter described in FIGS. 8, 9, and 10.

The electric relays 302 and 312 as well as those to be described in FIGS. 13, 14, and 15 that can be used in the embodiments herein are any of a number of electric devices to connect and disconnect electric circuits including but not limited to electric relays, contacts, solid-state switches, and TRIAC (bidirectional triode thyristor or bilateral triode thyristor).

The on-grid and off-grid control circuits 304 and 314 as well as those to be described in FIGS. 13, 14, and 15 convert the digital control signals to appropriate AC or DC signals that can drive the electric relays or the other types of electric connecting and disconnecting devices such as contacts, solid-state switches, and TRIAC.

Since the described on/off-grid power inverter has on-grid and off-grid modes, switching between the 2 modes can be designed based on automatic or manual switching methods. In FIGS. 8 and 10, a 3-position manual switch is described to select the auto position, on-grid position, or off-grid position. In FIG. 9, the described on/off-grid power inverter is designed to be able to switch between the on-grid and off-grid mode automatically without human interaction.

As a case example in the following, we assume the inverter can switch between the on-grid and off-grid mode automatically depending on the grid condition. During the start-up period, the inverter is not generating power, and both electric relays 302 and 312 are open. If there is grid power, the inverter will be switched to the on-grid mode and then goes through a startup sequence before generating AC power to be sent to the grid.

During the on-grid mode, the electric relay 302 is closed and electric relay 312 is open. If there is grid power, the inverter will continue to send power to the grid. As soon as the grid is down, it will stop generating power within a fraction of a second based on the UL1741 requirement. Then, the inverter will send a control signal to disconnect the on-grid electric relay 302 through the on-grid control circuit 304. After waiting a few seconds, it will send a control signal to connect the off-grid electric relay 312 through the off-grid control circuit 314. The inverter then starts to send a test signal to check: (1) if there is AC present in the off-grid circuit, and (2) if there is an AC load in the off-grid circuit. If there is no AC present and an AC load is detected, it will start to generate power to power the load through the single-phase off-grid circuit. Now, the inverter is working in the off-grid mode.

During the off-grid mode, the electric relay 302 is open and electric relay 312 is closed. The inverter is constantly detecting if there is grid power. After grid power is detected, the inverter will wait for a few minutes to assure the grid is stable. Then, it will first stop generating power to the off-grid circuit. After the inverter assures that power generation is halted, it will send a signal to disconnect the off-grid electric relay 312 through the off-grid control circuit 314. Then, the inverter sends a signal to close the on-grid electric relay 302 through the on-grid control circuit 304. After a 5-minute mandatory waiting period, the inverter starts to generate power and supplies AC power to split-phase AC power grid. Now, the inverter is working in the on-grid mode.

The operations of the on-grid AC output port 300, the off-grid AC output port 310, and those on-grid AC output ports and off-grid AC output ports to be described in FIG. 13, 14, 15 are very similar. The differences are mainly related to the single-phase, split-phase, and three-phase AC wiring and related electrical circuits.

FIG. 13 is a block diagram illustrating an on/off-grid power inverter's on-grid AC output port to supply AC power to a single-phase AC power grid, and inverter's off-grid AC output port to supply AC power to single-phase AC loads, according to an embodiment of this invention.

In FIG. 13, the inverter's on-grid AC output port 320 comprises an on-grid electric relay 322, an on-grid control circuit 324, an internal on-grid AC powerline 326, and an external on-grid AC powerline 328. The inverter's off-grid AC output port 330 comprises an off-grid electric relay 332, an off-grid control circuit 334, an internal off-grid AC powerline 336, and an external off-grid AC powerline 338. The external on-grid AC powerline 328 is connected to a single-phase power grid. The external off-grid AC powerline 338 is connected with a single-phase off-grid AC circuit. The Common line of the single-phase AC of the power grid and Common line of the single-phase AC of the off-grid circuit are connected to the earth ground 339. The control circuits 324 and 334 are connected to and controlled by a digital microcontroller.

Compared with the AC circuits in FIG. 12, this is a simpler case since both on-grid and off-grid AC are single-phase. This is quite typical for the AC standards in Europe, Asia, and Africa, where single-phase 220V, 230V, 50 Hz AC is used for both on-grid and off-grid modes.

FIG. 14 is a block diagram illustrating an on/off-grid power inverter's on-grid AC output port to supply AC power to a three-phase AC power grid, and inverter's off-grid AC output port to supply AC power to single-phase AC loads, according to an embodiment of this invention.

In FIG. 14, the inverter's on-grid AC output port 340 comprises an on-grid electric relay 342, an on-grid control circuit 344, an internal on-grid AC powerline 346, and an external on-grid AC powerline 348. The inverter's off-grid AC output port 350 comprises an off-grid electric relay 352, an off-grid control circuit 354, an internal off-grid AC powerline 356, and an external off-grid AC powerline 358. The external on-grid AC powerline 348 is connected to the L1, L2, and L3 lines of a three-phase power grid. The external off-grid AC powerline 358 is connected with a single-phase off-grid AC circuit. The Neutral line of the three-phase AC of the power grid and Common line of the single-phase AC of the off-grid circuit are connected to the earth ground 359. The control circuits 344 and 354 are connected to and controlled by a digital microcontroller.

Compared with the AC circuits in FIGS. 12 and 13, this is a more complex case since the grid power is three-phase AC and the off-grid electric circuit is single-phase AC.

FIG. 15 is a block diagram illustrating an on/off-grid power inverter's on-grid AC output port to supply AC power to a three-phase AC power grid, and inverter's off-grid AC output port to supply AC power to three-phase AC loads, according to an embodiment of this invention.

In FIG. 15, the inverter's on-grid AC output port 360 comprises an on-grid electric relay 362, an on-grid control circuit 364, an internal on-grid AC powerline 366, and an external on-grid AC powerline 368. The inverter's off-grid AC output port 370 comprises an off-grid electric relay 372, an off-grid control circuit 374, an internal off-grid AC powerline 376, and an external off-grid AC powerline 378. The external on-grid AC powerline 368 is connected to the L1, L2, and L3 lines of a three-phase power grid. The external off-grid AC powerline 378 is connected the L1, L2, and L3 lines of a three-phase off-grid AC circuit. The Neutral line of the three-phase AC of the power grid and Neutral line of the three-phase AC of the off-grid circuit are connected to the earth ground 379. The control circuits 364 and 374 are connected to and controlled by a digital microcontroller.

Compared with the AC circuits in FIG. 12 13, 14, this design has three-phase AC for both on-grid and off-grid circuits. Three-phase electric motors are a good example of three-phase AC loads that may run in either on-grid or off-grid modes.

The applying organization of this patent has built commercial multi-channel on-grid power inverters for on-grid applications and multi-channel off-grid power inverters for off-grid applications. The described smart and grid-flexible power inverters, or on/off-grid power inverters, take the unique design and concept of multi-channel power inverters to the next level.

When the on/off-grid power inverters are used in solar power systems, the grid-flexible solar power system can generate AC power regardless of the grid condition. The system can supply generated AC power to the electric power grid when the grid is on or supply AC power to electric devices when the grid is down. The disclosed method and apparatus can significantly improve the usefulness of solar power systems and make them more competitive compared with fossil fuel and other types of renewable energy, resulting in better return-on-investment (ROI) and faster adoption of solar energy in the global market.

Climate changes in our world are becoming more catastrophic. Power grid brownouts and shutdowns become more frequent and severe, resulting in loss of production and personal hardship. With the on/off-grid power inverters and the grid-flexible solar power systems, we can be more capable of dealing with power grid instability and shutdowns to reduce the disruption to our way of life.

The invention claimed is:
1. An on/off-grid power inverter system, comprising:
a) one or multiple DC input ports;
b) an on-grid AC output port connected to an electric grid;
c) an off-grid AC output port connected to an off-grid AC circuit;
d) a DC-AC inverter constructed and arranged to receive DC power from the one or multiple DC input ports, invert the DC power to AC power, and supply AC power through said on-grid AC output port to the electric grid in on-grid mode when grid is on, or supply AC power through said off-grid AC output port to power AC loads in the off-grid AC circuit in off-grid mode when grid is down;
e) for each AC output port, an internal AC powerline that conducts AC power from the DC-AC inverter to the grid or to corresponding AC loads through a corresponding external AC powerline;
f) for each AC output port, an electric relay arranged to isolate the internal AC powerline connected to that particular AC output port from its corresponding external AC powerline;
g) for each DC input port, a DC-DC boost converter arranged to convert the voltage of a DC power source to a higher DC voltage suitable for inversion;
h) a DC power combiner connected to the DC-DC boost converters for combining the DC output from all DC-DC boost converters and allowing the DC-DC boost converters to connect in parallel so that all DC currents are added together, the DC power combiner being connected to the DC-AC inverter;
i) a load interface circuit connected to the DC-AC inverter and to the internal AC powerlines, said load interface circuit being arranged to filter high-frequency components out of each of the DC-AC inverter's AC outputs;
j) a load detector connected to the internal and external AC powerlines for the off-grid AC output port, and arranged to detect the impedance of the connected AC loads;
k) a digital microcontroller connected to the DC-DC boost converters, DC-AC inverter, load interface circuit, electric relays of the AC output ports, and load detector, said digital microcontroller arranged to monitor the DC boost voltage, control the DC-DC boost converters, perform maximum power point tracking (MPPT), control DC-AC inversion, control AC synchronization when in on-grid mode, monitor AC output current and voltage, close or open electric relays of the AC output ports, perform powerline communications, detect off-grid AC circuit status, check the impedance of the AC load in the off-grid circuit to determine if it is within predetermined specifications, switch between on-grid mode and off-grid mode depending on the grid condition, and regulate AC output voltage when in off-grid mode;
l) a powerline modem connected to the digital microcontroller and internal AC powerlines through an interface circuit arranged to establish a 2-way digital signal communication between the digital microcontroller and the outside world through the external AC powerlines;
m) a line sensing circuit connected to the AC external powerlines and the digital microcontroller, and arranged to detect if there is AC power on the external AC powerlines, and to measure the AC output voltage and current as real-time feedback signals for the DC-AC inverter to regulate the AC output voltage when working in off-grid mode; and
n) a power supply connected to said DC power combiner and arranged to supply DC power to the electronic components of the DC-AC inverter.

2. The on/off grid power inverter system of claim 1, in which the DC input ports are arranged to connect to multiple DC sources including photovoltaic solar panels, wind generators, or batteries, or any combination thereof.

3. The on/off grid power inverter system of claim 1, in which the on-grid output and off-grid output of the on/off-grid power inverter system is single-phase AC.

4. The on/off grid power inverter system of claim 1, in which the on-grid output and off-grid output of the on/off-grid power inverter system is three-phase AC.

5. The on/off grid power inverter system of claim 1, in which the digital microcontroller includes Model-Free Adaptive (MFA) controllers that control the DC-DC boost converters, control AC output current in on-grid mode, and regulate the AC output voltage in off-grid mode, and MFA optimizers that provide maximum power point tracking (MPPT) to allow the DC-AC inverter to achieve optimal power production.

6. The on/off grid power inverter system of claim 1 further comprising an on-grid AC input port coupled with the on-grid AC output port.

7. The on/off grid power inverter system of claim 1, further comprising a 3-position manual switch arranged to select the on/off grid power inverter system to work in the following positions:
(a) auto position, where the digital microcontroller can switch between the on-grid mode and off-grid mode automatically based on the grid condition;
(b) on-grid mode, where the on/off grid power inverter system works as an on-grid inverter to supply power to the grid through its on-grid output port; and
(c) off-grid mode, where the on/off grid power inverter system works as an off-grid power inverter system to supply power to AC loads through its off-grid output port.

8. A system for providing AC power to an electric grid or to an off-grid AC circuit respectively from a plurality of individual DC power sources each having a DC output port, comprising:
a) a plurality of on/off-grid power inverter systems, each having a plurality of DC input ports, an on-grid AC input port, an on-grid AC output port, and an off-grid AC output port;
b) the on-grid AC output port of each on/off grid power inverter system being connected in a daisy chain to the on-grid AC input port of the next on/off grid power inverter system, except for the on-grid AC output port of the first on/off grid power inverter system being connected to the electric grid, and the on-grid AC input port of the last on/off grid power inverter system being left open;
c) said on-grid AC output port of the first on/off grid power inverter system being arranged to supply AC power produced by all of the on/off grid power inverter systems to the electric grid; and
d) the off-grid AC output port of each on/off grid power inverter system being connected to an off-grid AC circuit and arranged to supply AC power to AC loads in the off-grid circuit when working in off-grid mode;
each of the on/off grid power inverter systems comprising:
aa) for each AC output port, an internal AC powerline that conducts the AC power from the on/off-grid power inverter system to the grid or to corresponding AC loads through an external AC powerline;

bb) for each AC output port, an electric relay arranged to isolate the internal AC powerline from the external AC powerline;

cc) for each DC input port, a DC-DC boost converter arranged to convert the voltage of a DC power source to a higher DC voltage suitable for inversion;

dd) a DC power combiner connected to the DC-DC boost converters for combining the DC output from all DC-DC boost converters and allowing the DC-DC boost converters to connect in parallel so that all DC currents are added together;

ee) a DC-AC inverter connected to the DC power combiner and arranged to invert DC power to AC power;

ff) a load interface circuit connected to the DC-AC inverter and to the internal AC powerlines, said load interface circuit being arranged to filter high-frequency components out of the DC-AC inverter's AC output;

gg) a load detector connected to the internal and external AC powerlines of the off-grid AC output port, and arranged to detect the impedance of the connected AC loads;

hh) a digital microcontroller connected to the DC-DC boost converters, DC-AC inverter, load interface circuit, electric relays of the AC output ports, and load detector, said digital microcontroller arranged to monitor the DC boost voltage, control the DC-DC boost converters, perform maximum power point tracking (MPPT), control DC-AC inversion, control AC synchronization when in on-grid mode, monitor AC output current and voltage, close or open electric relays of the AC output ports, perform powerline communications, detect off-grid AC circuit status, check the impedance of the AC load in the off-grid circuit to determine if it is within predetermined specifications, switch between on-grid mode and off-grid mode depending on the grid condition, and regulate AC output voltage when in off-grid mode;

ii) a powerline modem connected to the digital microcontroller and internal AC powerlines through an interface circuit arranged to establish a 2-way digital signal communication between the digital microcontroller and the outside world through the external AC powerline;

jj) a line sensing circuit connected to the AC powerlines and the digital microcontroller, and arranged to detect if there is AC power on the powerlines, and measure the AC output voltage and current as real-time feedback signals for the inverter to regulate the AC output voltage when working in off-grid mode; and kk) a power supply connected to said DC power combiner and arranged to supply DC power to the electronic components of the on/off grid power inverter system.

9. The system for providing AC power to the electric grid or to an off-grid AC circuit of claim 8, in which the on-grid output and off-grid output of each said on/off-grid power inverter system is single-phase AC.

10. The system for providing AC power to the electric grid or to an off-grid AC circuit of claim 8, in which the on-grid output and off-grid output of each said on/off-grid power inverter system is three-phase AC.

* * * * *